(12) United States Patent
Kolagheichi-Ganjineh et al.

(10) Patent No.: US 12,411,023 B2
(45) Date of Patent: *Sep. 9, 2025

(54) METHOD AND SYSTEM FOR VIDEO-BASED POSITIONING AND MAPPING UTILIZING A PIXEL WISE SEGMENTATION ON AN IMAGE OF A DETECTED OBJECT

(71) Applicant: TomTom Global Content B.V., Amsterdam (NL)

(72) Inventors: Tinosch Kolagheichi-Ganjineh, Berlin (DE); Philipp Holzschneider, Berlin (DE); Dimitri Schachmann, Berlin (DE); Sergej Mann, Berlin (DE); Sebastian Ihlefeld, Berlin (DE); Michael Hofmann, Amsterdam (NL); Olaf Booij, Leiden (NL); Nicolau Leal Werneck, Amsterdam (NL)

(73) Assignee: TomTom Global Content B.V., Amsterdam (NL)

( * ) Notice: Subject to any disclaimer, the term of this patent is extended or adjusted under 35 U.S.C. 154(b) by 33 days.

This patent is subject to a terminal disclaimer.

(21) Appl. No.: 18/527,317

(22) Filed: Dec. 3, 2023

(65) Prior Publication Data

US 2024/0167844 A1    May 23, 2024

Related U.S. Application Data

(63) Continuation of application No. 18/088,710, filed on Dec. 26, 2022, now Pat. No. 11,835,358, which is a
(Continued)

(30) Foreign Application Priority Data

Dec. 9, 2016   (EP) ...................................... 16203258
Sep. 7, 2017   (GB) ...................................... 1714381

(51) Int. Cl.
*G06C 21/00*   (2006.01)
*G01C 21/00*   (2006.01)
(Continued)

(52) U.S. Cl.
CPC ......... *G01C 21/3848* (2020.08); *G01C 21/32* (2013.01); *G01C 21/3811* (2020.08);
(Continued)

(58) Field of Classification Search
CPC .......................... G01C 21/3848; G01C 21/32; G01C 21/3811; G01C 21/3859; G06F 16/29;
(Continued)

(56) References Cited

U.S. PATENT DOCUMENTS 8,406,992 B2 *   3/2013   Laumeyer ............ G06Q 10/047
                                                                 701/400
9,884,623 B2 *   2/2018   Fasola .................. G06V 20/647
(Continued)

FOREIGN PATENT DOCUMENTS

CN   101952688 A    1/2011
JP   2009163714 A    7/2009
(Continued)

OTHER PUBLICATIONS

Lategahn H. et al., Visual SLAM for Autonomous Ground Vehicles, 2011 IEEE International Conference on Robotics and Automation, 2011.

*Primary Examiner* — Pakee Fang
(74) *Attorney, Agent, or Firm* — Buckley, Maschoff & Talwalkar LLC

(57) ABSTRACT

A method and system for determining a geographical location and orientation of a vehicle travelling through a road network is disclosed. The method comprises obtaining, from one or more cameras associated with the vehicle travelling through the road network, a sequence of images reflecting
(Continued)

the environment of the road network on which the vehicle is travelling, wherein each of the images has an associated camera location at which the image was recorded. A local map representation representing an area of the road network on which the vehicle is travelling is then generated using at least some of the obtained images and the associated camera locations. The generated local map representation is compared with a section of a reference map, the reference map section covering the area of the road network on which the vehicle is travelling, and the geographical location and orientation of the vehicle within the road network is determined based on the comparison. Methods and systems for generating and/or updating an electronic map using data obtained by a vehicle travelling through a road network represented by the map are also disclosed.

16 Claims, 14 Drawing Sheets

Related U.S. Application Data continuation of application No. 16/467,977, filed as application No. PCT/EP2017/082293 on Dec. 11, 2017, now Pat. No. 11,761,790.

(51) Int. Cl.
| | | |
|---|---|---|
| *G01C 21/32* | (2006.01) | |
| *G06F 16/29* | (2019.01) | |
| *G06F 16/587* | (2019.01) | |
| *G06T 7/11* | (2017.01) | |
| *G06T 7/73* | (2017.01) | |
| *G06V 20/56* | (2022.01) | |
| *G06V 20/58* | (2022.01) | |

(52) U.S. Cl.
CPC ............ *G06F 16/29* (2019.01); *G06F 16/587* (2019.01); *G06T 7/11* (2017.01); *G06T 7/74* (2017.01); *G06V 20/582* (2022.01); *G06V 20/588* (2022.01); *G06T 2207/10016* (2013.01); *G06T 2207/30244* (2013.01); *G06T 2207/30256* (2013.01)

(58) Field of Classification Search
CPC ........ G06F 16/587; G06F 16/583; G06T 7/11; G06T 7/74; G06T 2207/10016; G06T 2207/30244; G06T 2207/30256; G06T 2207/30252; G06T 7/75; G06V 20/582; G06V 20/588; G06V 10/267; G06V 20/56
See application file for complete search history.

(56) References Cited

U.S. PATENT DOCUMENTS

| | | | | |
|---|---|---|---|---|
| 10,908,606 | B2* | 2/2021 | Stein | B60W 40/06 |
| 2010/0305851 | A1* | 12/2010 | Meyer | G01C 21/20 |
| | | | | 701/532 |
| 2014/0297059 | A1 | 10/2014 | Mizutani et al. | |
| 2014/0323148 | A1 | 10/2014 | Schmalstieg et al. | |
| 2017/0236284 | A1* | 8/2017 | Elliethy | G06T 7/33 |
| | | | | 382/294 |

FOREIGN PATENT DOCUMENTS

| | | |
|---|---|---|
| JP | 2014194625 A | 10/2014 |
| JP | 2016-528476 A | 9/2016 |
| WO | 2016195698 A1 | 12/2016 |

* cited by examiner

Figure 9
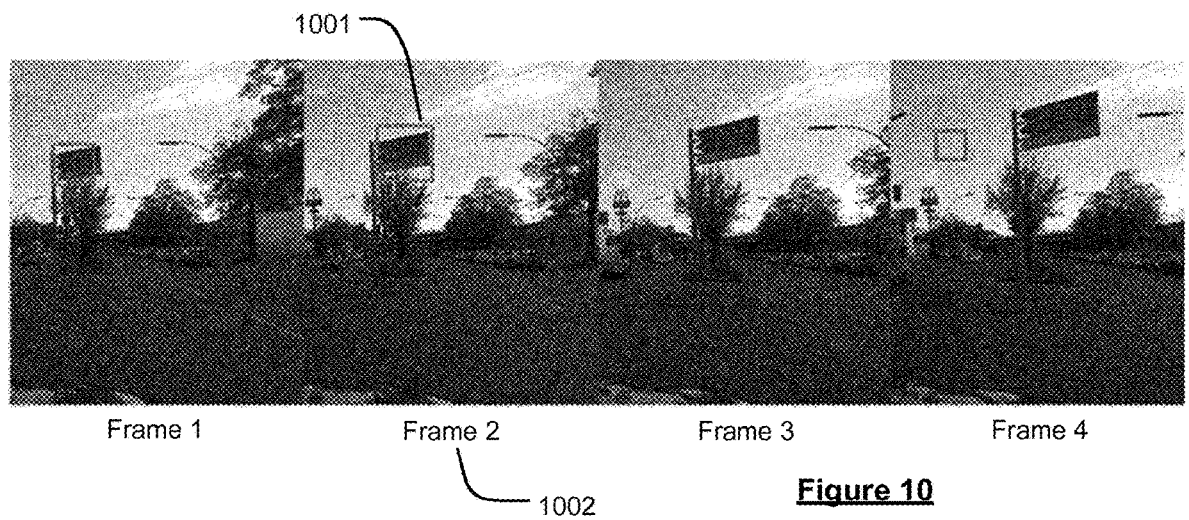
Frame 1  Frame 2  Frame 3  Frame 4
Figure 10
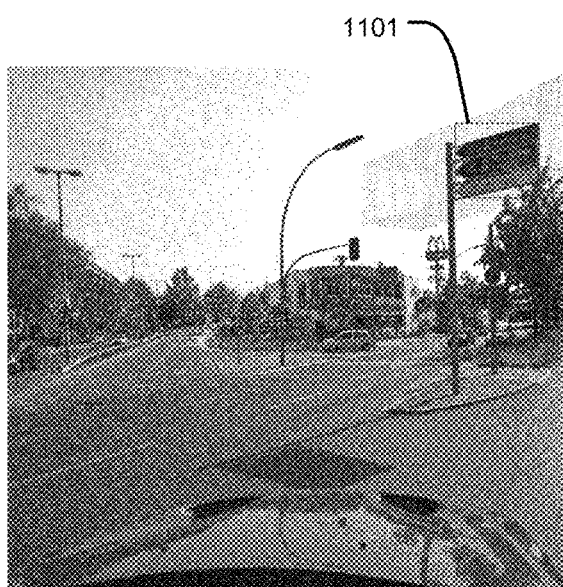
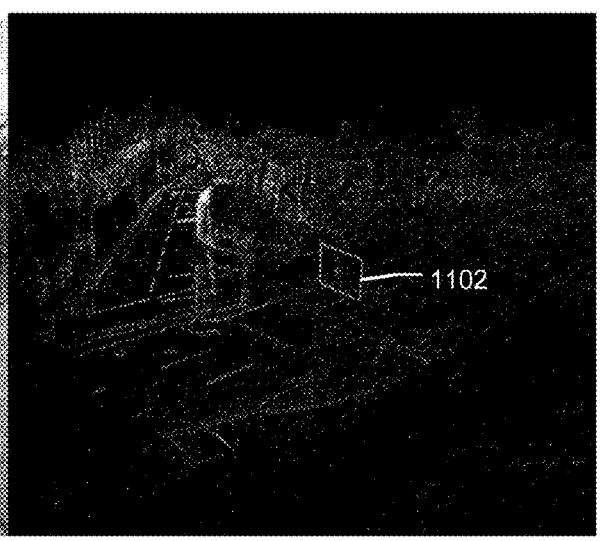
Figure 11A  Figure 11B

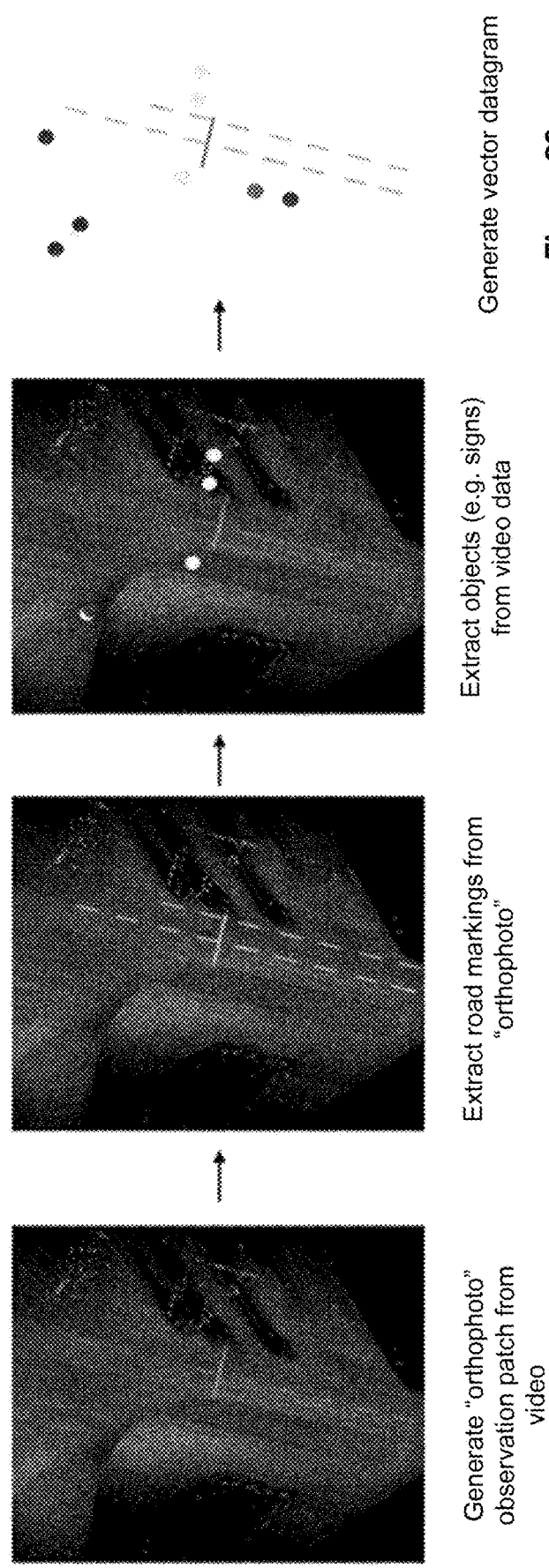

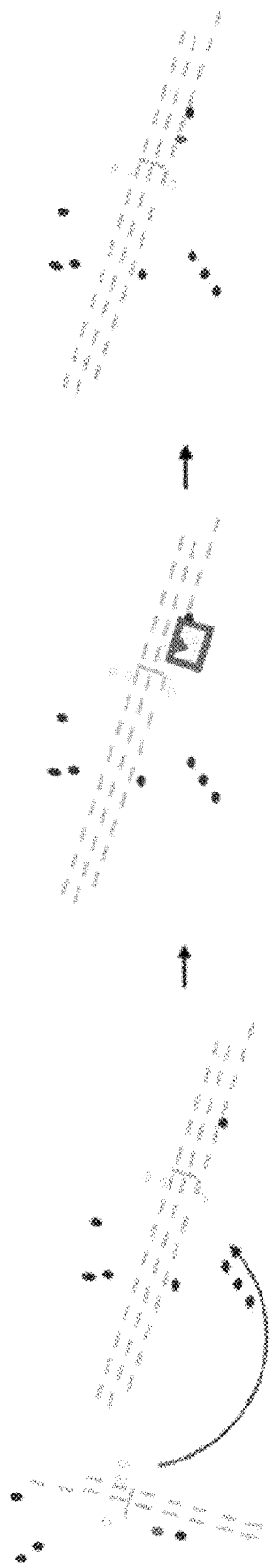

METHOD AND SYSTEM FOR VIDEO-BASED POSITIONING AND MAPPING UTILIZING A PIXEL WISE SEGMENTATION ON AN IMAGE OF A DETECTED OBJECT

FIELD OF THE INVENTION

The present disclosure refers to a method and a system for determining a geographical location and orientation of an observer, e.g. a vehicle travelling along a road network. Further, a method and system for generating and/or updating an electronic map (i.e. for mapping) is provided. In embodiments, a visual global positioning and mapping system may be provided.

BACKGROUND TO THE INVENTION

Navigation and motion planning are crucial components of highly automated and autonomous driving. An autonomous vehicle needs to be able to automatically localise itself within the world to determine a safe course of action. On the one hand a map is needed to allow localisation on a global scale for route planning which is solved by global navigation satellite systems. On the other hand a precise geometric representation of the immediate environment is required for functions like lane keeping and adherence to traffic signage. Conventionally, this is solved either solely by ad-hoc sensing of the surroundings without a prior map or with the support of a highly precise pre-built map. Ad-hoc sensing is the minimum required capability for autonomous action and is often extended by on-the-fly map generation from recent sensor data. This is particularly useful when the same area is revisited soon after. However, ad-hoc sensing of the environment is prone to errors and it is highly desirable to already have high quality information on the surroundings (i.e. a map), which allows to verify and support the direct sensing by matching against it.

Optionally and ideally a high quality pre-built map is already available which would prevent sensing errors from feeding into an on-the-fly map and thus improving motion planning and the safety of the vehicle. However, a pre-built map reflects how the world once was as opposed to how it is during actual autonomous driving. This means that pre-built maps need to be kept up-to-date to ensure safe navigation and motion planning.

Apart from the map of the current region, the planning system in the vehicle needs to know where it is localised within that map. For on-the-fly maps, which are created from ad-hoc sensing, this is trivially the case, but there is no immediate connection to a pre-built map. To be useful the structure and contained information of a pre-built map needs to allow precise localisation of the vehicle in it. By some way of comparing and aligning the on-the-fly created map with the pre-build map, the position and orientation of the vehicle in the pre-built map needs to be determined. This imposes certain requirements on the design of the pre-built map, such as data representations which are suitable for comparison with ad-hoc sensor data.

Maps for autonomous driving need to suit the restrictions and requirements of the application. The limited resources in a car impose algorithms and data structures which use computation time, memory and mobile bandwidth economically. While respecting these restrictions, the system needs to fulfil the functional requirements for autonomous driving. These include determining semantic information about the surroundings, such as the trafficability of given terrain, location and motion of dynamic (e.g. other cars) and static (e.g. road construction, traffic signs) objects.

For large scale deployment the maps need to be flexible enough to incorporate the plethora of road geometries and artefacts and be able to scale to a global size without sacrificing up-to-dateness and performance. The data structures need to be extensible enough for additional geometric and semantic layers.

Autonomous driving is an active research field and great progress is made every year towards fully self-driving cars. Still, many challenges that are required for full autonomy are not solved and the research community did not yet determine all the prerequisites for safe planning and driving, but even known problems exist, to which there is no definite solution.

While there are numerous propositions and implementations for autonomous driving platforms, none has gained the status of an accepted standard solution for the mapping and localisation problem. There is also no standard solution for aggregating ad-hoc data into an on-the-fly map which simultaneously facilitates immediate motion planning and additional map matching (i.e. localisation) against a pre-built map on a global scale.

The update of a pre-built map with new on-the-fly data is also crucial and not generally solved. This would include solving the problem of efficient map matching, automatic object detection (such as traffic signs), as well as an intuitive presentation to human operators for manual data curation.

Currently Available Maps

A further issue is the lack of pre-built map material which complies with the requirements of autonomous driving. Most map data is gathered at infrequent intervals and is thus often out-of-date and does not offer easy methods to incorporate new data. Examples are aerial photos and manual mapping by municipal employees. Much of the available map data is also not structured for algorithmic access, such as the aforementioned aerial photos, which are made up of pixels with no structural data available. Map precision is also often not sufficient and calls for custom map creation by each research group working on autonomous driving.

Current state of the art maps that have been explicitly created for autonomous driving are most often also not optimal and are applicable only in situations with the same time of day and weather conditions as at time of recording. Furthermore, frequently used data structures often prove to be too inefficient for truly global maps. These kinds of maps usually contain unstructured sensor data, which is hard to align with sensor data due to its volume. Moreover, there is often no precise connection to the GIS coordinate system, making the map not interoperable with other maps. Maps for autonomous driving these days are frequently on-the-fly maps stored to long term storage. What is needed are maps which are specialized from the get-go for reliable vehicle localisation.

Heterogeneous Sensor Setup

An additional challenge is the handling of data from different sensors and even sensor types (e.g. mono cameras, stereo cameras, lidar, radar, etc.), especially since maps which store just the raw sensor data are not applicable for localisation with a slightly different sensor. Thus, a general map needs to provide semantic information of the environment, which can be found with all sensor types.

Non-Functional Requirements

Mapping and localisation systems face also non-functional requirements and none of the state of the art methods accomplishes to fulfil these together with the previously stated functional requirements. The design of a system needs not only work in a lab environment but is subject to feasibility and implementation costs on a global scale, which includes being able to run on commodity hardware and within the limitations of modest capacity of mobile data connections.

SUMMARY OF THE INVENTION

According to a first aspect of the present invention there is provided a method for determining a geographical location and orientation of a vehicle travelling through a road network, the method comprising:

obtaining, from one or more cameras associated with the vehicle travelling through the road network, a sequence of images reflecting the environment of the road network on which the vehicle is travelling, wherein each of the images has an associated camera location at which the image was recorded;

generating, using at least some of the obtained images and the associated camera locations, a local map representation representing an area of the road network on which the vehicle is travelling;

comparing the generated local map representation with a section of a reference map, the reference map section covering the area of the road network on which the vehicle is travelling; and determining, based on the comparison, the geographical location and orientation of the vehicle within the road network.

The present invention also extends to a system for carrying out a method in accordance with this aspect of the invention, or any of its embodiments, herein described.

Thus, from another aspect, there is provided a system for determining a geographical location and orientation of a vehicle travelling through a road network, the system comprising:

means for obtaining, from one or more cameras associated with the vehicle travelling through the road network, a sequence of images reflecting the environment of the road network on which the vehicle is travelling, wherein each of the images has an associated camera location at which the image was recorded;

means for generating, using at least some of the obtained images and the associated camera locations, a local map representation representing an area of the road network on which the vehicle is travelling;

means for comparing the generated local map representation with a section of a reference map extracted from a map repository, the reference map section covering the area of the road network on which the vehicle is travelling; and means for determining, based on the comparison, the geographical location and orientation of the vehicle within the road network.

This further aspect of the present invention can and preferably does include any one or more or all of the preferred and optional features of the invention described herein in respect of any other aspects or embodiments of the invention, as appropriate. For example, even if not explicitly stated, the system may comprise means for carrying out any step or steps described in relation to the method herein in any of its aspects or embodiments, and vice versa. The means for carrying out any of the steps described in relation to the method or system may comprise one or more processors and/or processing circuitry. The present invention is therefore preferably a computer implemented invention, and any of the steps described in relation to any of the aspects or embodiments of the invention may be carried out under the control of a set of one or more processors and/or processing circuitry.

In embodiments, the present invention relates to techniques for determining a geographical location and orientation of a vehicle travelling through a road network, i.e. for "localising" the vehicle within the road network. The determined geographical location and orientation, or localisation result, may, for example, be used for the purposes of navigation and motion planning for an autonomous vehicle. For instance, the localisation result may be provided as input to an autonomous driving module of the vehicle, e.g. in order to determine the next action that the vehicle should take. As described herein, at least in some aspects, the geographical location and orientation of a vehicle that is travelling within a road network can be determined from a sequence of images (e.g. a video sequence) recorded by one or more cameras associated with the vehicle. The images will include image content relating to the local environment of the road network within which the vehicle is travelling, i.e. containing whatever objects are captured within the camera or cameras field of view. The sequence of images will therefore reflect the movement of the vehicle through the road environment. That is, the sequence of images will generally reflect the changes in the local environment as the vehicle moves through the road network. Each of the images will therefore generally have been recorded at a different location. Thus, in order to aggregate the information from the different images to generate a consistent local map representation of the area within which the vehicle is travelling, it is necessary to know the associated camera locations for the images. The camera locations for the obtained images may be known or provided with the images as they are obtained (e.g. from an on-board odometry system and/or global navigation satellite system (GNSS) data). Alternatively, and in preferred embodiment, the camera locations for the different images may be determined visually from the images, e.g. using visual odometry (as is discussed in more detail below). The plurality of images and the associated camera locations can thus be processed to extract information regarding the environment of the road network which information can then be incorporated into a local map representation representing an area of the road network on which the vehicle is travelling. Thus, the local map representation so obtained by processing the plurality of images is generally indicative of the environment of the road network of the area around the vehicle. The local map generation that is generated can then be compared (e.g. matched) with a reference map section covering (at least) the approximate area within which the vehicle is travelling in order to determine the geographical location and orientation of the vehicle within the road network, e.g. by determining the vehicle's ego motion relative to the reference map. As will be appreciated the reference map is considered ground truth for the purposes of the invention, such that the location and orientation of an object represented in the reference map matches the location and orientation of the object in the real world. In this way, i.e. by processing the recorded images to generate a local map representation which can then be compared (matched) with a corresponding reference map, the location and orientation of the vehicle within the road network can be accurately determined from the images. Thus, according to embodiments of the present invention, a visual localisation of the vehicle within the road network may be obtained. The localisation result may then be used in various ways, as desired. For example, as mentioned above, the localisation result may be provided as input to an autonomous driving module of an autonomous vehicle or to some other advanced driver-assistance system where an accurate localisation may be desired.

The local map representation that is generated may also be used in turn to update the (or to generate a new) reference map section. For instance, where the local map representation includes features that are not included in, or otherwise contradict, the previously-compiled reference map, the reference map may then be updated accordingly. Thus, at least in some embodiments, the techniques presented herein also provide a way for efficiently updating pre-built reference maps with new data that is obtained on the fly. For instance, by comparing the generated local map representation with the reference map, one or more errors in the reference map may be identified. For example, an error may either be a feature that is missing from the reference map, or a feature that needs to be removed from or modified in the reference map. When such errors are identified, the reference map may be updated accordingly. For instance, when such errors are identified, the local map representation may then be provided to a remote server in order to update the reference map, e.g. by updating the, or generating a new, reference map section to be incorporated into the reference map based on the local map representation. However, it will be appreciated that the entire local map representation need not necessarily be provided to the remote server, and in some embodiments, data indicative of the local map representation and/or of the identified errors may instead be provided to the remote server in order to update (or generate a new) reference map section. For example, one or more features from the local map representation, or one or more of the obtained images, may be provided to the remote server and used to update (or generate) the section of reference map accordingly. For instance, when the local map representation is generated on board the vehicle, this may reduce the amount of data that needs to be transmitted to the remote server.

In embodiments, the techniques may involve outputting the localisation result and also providing the local map representation, or data indicative thereof, or data indicative of any errors in the reference map identified based on the comparison with the local map representation. In some cases, the localisation result may also be used for the purposes of updating the reference map section, e.g. for error correcting purposes. However, at least in some embodiments, it is contemplated the present techniques may also be used for mapping purposes without necessarily outputting a localisation result. That is, according to some embodiments, image data obtained from one or more vehicles may be used to generate and/or to update an electronic map.

Accordingly, from another aspect of the present invention, there is provided a method for updating and/or generating an electronic map using data obtained by a vehicle travelling through a road network represented by the map, the method comprising:
  obtaining, from one or more cameras associated with the vehicle travelling through the road network, a sequence of images reflecting the environment of the road network on which the vehicle is travelling, wherein each of the images has an associated camera location at which the image was recorded;
  generating, using at least some of the images and the associated camera locations, a local map representation representing an area of the road network on which the vehicle is travelling;
  comparing the generated local map representation with a section of a reference map;
  identifying, based on the comparison, one or more errors in the reference map section; and
  providing, when one or more errors are identified, the local map representation, or data indicative of the local map representation, to a remote server for updating the reference map section and/or generating a new reference map section.

The present invention also extends to a mapping system for carrying out a method in accordance with this aspect of the invention, or any of its embodiments, herein described.

Thus, from another aspect, there is provided a system for generating and/or updating an electronic map using data obtained by a vehicle travelling through a road network represented by the map, the system comprising:
  means for obtaining, from one or more cameras associated with the vehicle travelling through the road network, a sequence of images reflecting the environment of the road network on which the vehicle is travelling, wherein each of the images has an associated camera location at which the image was recorded;
  means for generating, using at least some of the images and the associated camera locations, a local map representation representing an area of the road network on which the vehicle is travelling;
  means for comparing the generated local map representation with a section of a reference map;
  means for identifying, based on the comparison, one or more errors in the reference map section; and
  means for providing, when one or more errors are identified, the local map representation, or data indicative of the local map representation, to a remote server for updating the reference map section and/or generating a new reference map section.

This further aspect of the present invention can and preferably does include any one or more or all of the preferred and optional features of the invention described herein in respect of any other aspects or embodiments of the invention, as appropriate. For example, even if not explicitly stated, the system may comprise means for carrying out any step or steps described in relation to the method herein in any of its aspects or embodiments, and vice versa. The means for carrying out any of the steps described in relation to the method or system may comprise one or more processors and/or processing circuitry. The present invention is therefore preferably a computer implemented invention, and any of the steps described in relation to any of the aspects or embodiments of the invention may be carried out under the control of a set of one or more processors and/or processing circuitry.

According to embodiments of the present invention, the local map representation, or at least data indicative thereof, preferably together with data indicative of the one or more identified errors in the reference map (using from the local map representation), may be provided to a remote server and used for the purposes of updating or generating an electronic reference map, as described above. Thus, when such information is provided to the remote server, the remote server may then use the provided local map representation, or data indicative thereof, to generate a new reference map section and/or to update a reference map stored on the remote server. The updated (or new) map may subsequently be downloaded for use by a vehicle (user), e.g. as described in relation to the first aspect. That is, the updated or generated electronic map may then be used as a reference map for subsequent localisation processes. Thus, the present invention, according to various aspects, generally relates to a visual localisation technique, as well as a related visual mapping technique, as will be explained further below.

The techniques presented herein may generally be used in any context where it is desired to provide an accurate localisation of a vehicle within a road network and/or to generate an accurate map including information regarding the local environment of the road network. Embodiments, however, relate particularly to techniques for localising autonomous vehicles, e.g. vehicles requiring minimal (or no) driver interaction. For instance, in embodiments, the result of the localisation may be provided to an autonomous driving module of the vehicle for the purposes of navigation and motion planning, i.e. automatic driving. Thus, the vehicle may comprise an autonomous vehicle, e.g. an autonomous car or truck, etc., that is travelling through a road network. However, it will be appreciated that the present techniques may also find utility in various other contexts, e.g. relating to non- or semi-autonomous vehicles. For example, it is also contemplated that the localisation may generally be used as part of any suitable advanced driver-assistance system, e.g. where an accurate localisation of the vehicle within the map is desirable. Also, it will be appreciated that the mapping result need not (although preferably will be) used for the purposes of facilitating autonomous driving, and may be used for generating improved maps for navigation for use as desired by any vehicles, e.g. as part of a conventional navigation guidance system.

The road network is generally a network comprising a plurality of interconnected roads that are navigable by a vehicle. The road network may generally be represented by a digital, or electronic, map (or mathematical graph). In its simplest form, an electronic map is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another. For the purposes of conventional navigation guidance, e.g. as may be provided by a known portable navigation device, the segments of the electronic map need only (and typically will only) contain information regarding the road centrelines, although each road segment may also be supplemented with attributes such as the maximum speed permitted, the lane size, number of lanes, whether there is a divider in-between, etc. However, according to embodiments of the present invention, as will be described further below, an electronic map may be generated (or used) that provides a more accurate and realistic representation of the roadway profile including lane centrelines and lane connectivity (i.e. lane markings), as well as other key elements e.g. such as three-dimensional geometries of the road network such as landmark objects that may be desirably incorporated into the map. This type of electronic map may be referred to as a "HD" map (compared to a conventional "SD" map containing the road centrelines but not the lane centrelines). The additional information contained in the HD map, and at least the lane markings, is generally required for the purposes of autonomous driving. However, the use of these HD maps is not limited to autonomous vehicles, and these maps may also find suitable application in any other application where it is desired to provide an improved and more accurate representation of the roadway profile, including, but not limited to, various advanced driver-assistance system applications. Thus, the HD map may also contain data representative of any other features that may suitably and desirably be presented to a user, or to an autonomous driving system, or other advanced driver assistance system (ADAS).

Embodiments of the present invention involve obtaining (and processing) a sequence of images from one or more cameras associated with a vehicle travelling through a road network. The sequence of images that are recorded by the camera or cameras may be obtained directly from the at least one camera, e.g. may be streamed directly from the cameras to an on-board processor of the vehicle that acts to generate the local map representation. However, in other embodiments, the images may be transmitted to a remote processor which then generates the local map representation using the received images (or image data). Indeed, in general, it will be appreciated that the various processors and processing steps described herein may be distributed as desired between one or more on-board processors and a remote server.

The one or more cameras are generally associated with a vehicle that is travelling through the road network. For instance, one or more cameras may suitably be located on or in the vehicle. In general, the camera or cameras may be located at any suitable and desired location on or in the vehicle so as to obtain images which may suitably be processed according to the techniques presented herein. For example, typically, at least one camera will obtain images of the scenery and road geometry ahead of the vehicle. However, one or more cameras may also be used to obtain images of the scenery surrounding the vehicle. In general, the obtained images will include image content that relates to the local environment of the road network in the area around and in front of the vehicle that may suitably be processed in order to extract information indicative of the environment of the road network for inclusion in the local map representation. For instance, the image content will typically include any objects that are included within the field of view of the camera or cameras at the point at which the image was recorded, so that the images capture not just information about the road and lane geometry, but also information regarding the general scenery, or environment, in the area within which the vehicle is travelling, e.g. including information about landmarks associated with the local environment such as buildings, traffic signs, traffic lights, billboards, etc., as well as information about the current conditions (and trafficability) of the road network. Thus, it will be understood that the image content generally contains information regarding the environment of the road network within the region within which the vehicle is travelling (and not just information about the road network itself). Because it is the image content that is used to generate the local map representation, which in turn may be used to (globally) update or generate a reference map, it will be appreciated that maps generated according to the techniques presented herein may be much richer and contain more useful information than conventional electronic maps, e.g. that simply show the road geometries based on the road centrelines.

The sequence of images reflect the movement of the vehicle through the road network. That is, each image in the sequence will represent the environment of the road network at a particular point in time and at a particular camera location. Preferably, the sequence of images comprises a video sequence. The images may therefore correspond to respective frames of a video sequence. Thus, the one or more cameras may, and in preferred embodiments do, comprise one or more video cameras.

In embodiments, one or more stereo cameras may be used to obtain (at least some of) the plurality of images. However, the use of a stereo camera is not necessary, and in some embodiments the images may be obtained using (only) one or more monocular or single cameras. In some preferred embodiments, the one or more cameras may comprise one or more stereo cameras and one or more single (monocular) cameras. For instance, in embodiments, as explained below, a plurality of stereo images obtained using stereo cameras may advantageously be used for the purposes of visual odometry. However, for the purposes of identifying and classifying objects in the images, it may be preferred to use images obtained from single (monocular) cameras.

The image data may be supplemented by data from various other sensors, as desired. For instance, positional data, such as GNSS data, may be used to provide a coarse localisation of the vehicle and a timestamp for each of the images.

Because the images in the sequence of images are generally obtained at different locations (e.g. reflecting the movement of the vehicle, and hence the associated camera or cameras, through the road network), in order to process the images together to generate a consistent local map representation of the area within which the vehicle is travelling it is necessary to know (or at least be able to determine) the camera location associated with each of the images. That is, each of the images represents a two-dimensional view of a certain part of the area. In order to generate a consistent view of the entire area, it is thus necessary to aggregate the different views from the different images together. This can be done based on knowledge of the locations at which the images were recorded. For instance, it will be appreciated that an object generally appears in any given image as a set of two-dimensional points. When a sequence of images is recorded, the same object may thus appear in multiple images but viewed from different perspectives. This is what allows the object to be localised, e.g. using triangulation. However, in order to generate a consistent local map representation, so that the object can be mapped from the images into a desired three-dimensional coordinate frame, e.g. to show the relative position and orientation of the object within the road network, the position and orientation (together, the "pose") of the camera used to obtain the different images must be taken into account. That is, in order to generate a consistent local map representation from a sequence of images recorded at different positions, it is necessary to know, or determine, the camera locations for the different images.

The locations at which the images were recorded (or "camera locations") may be provided as absolute locations, representing the absolute position and orientation (pose) of the camera within the road network at the point at which the image was located. Thus, in embodiments, the techniques comprise obtaining an absolute camera location for the images. However, this may require very high precision sensors which may not always be available. For example, each of the images may be location-stamped as they are obtained, e.g. using GNSS or other positional data, and the absolute locations may thus be obtained directly using such positional data, e.g. by using a high-precision odometer and/or GNSS data. Often, the accuracy of such GNSS or other positional data may not allow for a sufficiently high determination of the location for it to be reliably used for localisation (especially for autonomous driving where it is imperative that the vehicle is localised very accurately). Thus, the camera locations may be provided as relative locations, so that the camera location of (each) image is provided relative to one or more other images in the sequence, and the relative camera locations are then used for aggregating the images together to generate the local map representation of the area. The relative changes in camera locations from one image to the next may generally be determined using the vehicle's odometry (i.e. using one or more odometry sensors associated with the vehicle). For instance, the initial camera location, for the first image in the sequence, may be known (with relatively high accuracy), e.g. from GNSS or other positional data. The relative locations of the subsequent images in the sequence compared to the first image may then be determined based on the vehicle's odometry, i.e. based on knowledge of the movement of the vehicle through the road network. Thus, in embodiments, the techniques comprise determining a relative camera location of at least some of the images relative to a reference image such as the first image in the sequence.

The (relative) camera locations for the different images may be determined using any suitable and desired techniques. For instance, when stereo images are obtained, various known stereo imagery alignment techniques may be used to derive the relative camera locations for the images, e.g. by aligning consecutive depth images. However, preferably, the (relative) camera locations for the images are determined by a process of visual odometry. That is, the relative camera locations for the images may be determined (e.g. purely) visually from processing the images. For instance, visual odometry may be used to determine a rotation and position of an image (i.e. an image or camera "pose") relative to a reference image, which is typically the first image in the sequence of images, for which the initial position of the camera may generally be known. Thus, in embodiments, the image poses for the images in the sequence are determined relative to the initial position of the camera used to record the first (reference) image. The poses may be determined for each recorded image in the sequence of images. However, in general, the poses may only need to be determined, and in embodiments are only determined for a subset of the images (or frames), which are referred to as "key frames", i.e. images that show significant camera movement and/or changes in image content relative to the previously obtained image. Thus, for each image (or key frame), a relative pose is generated representing the rotation and position of the image relative to the first (reference) image. (The concept of "key frames", e.g. in video encoding, is generally well understood. In general, any reference herein to processing the sequence of images may involve processing all of the images or only some of the images, e.g. only the key frames. Alternatively, the sequence of images may comprise a sequence of key frames.)

GNSS or other positional data may be used to supplement the visual odometry. For instance, for each image (or key frame), a coarse camera location may be estimated from GNSS or other positional data, and this may then be refined using visual odometry based on the other images in the sequence.

The principles of visual odometry are well established and in general any suitable and desired visual odometry techniques may be used with the present invention. Typical visual odometry techniques are based on a "structure from motion" assumption, although other arrangements are possible, e.g. various stereographic techniques. Although visual odometry can be performed using single camera (or monocular) image data, preferably the images used for the visual odometry are obtained using one or more stereo cameras, e.g. so that the image depths for the images are known and can be provided as input to the visual odometry algorithm (which would otherwise have to somehow estimate or determine these, which can be difficult when the images are generated on the fly from a moving vehicle). Thus, in embodiments, any suitable and desired stereo visual odometry technique may be used.

The visual odometry may be performed indirectly, e.g. using a known bundle adjustment technique. However, preferably, a stereo direct sparse odometry (DSO) technique is used to obtain the image poses. DSO is a known technique based on the direct minimisation of photometric error between projections of objects onto a camera, wherein the objects are implicitly defined by a set of key points in a reference frame and a depth. Thus, in order to project, or track, the object from the reference frame into a subsequent frame, the key points are projected onto the subsequent frame and the photometric errors for the plurality of key points are minimised in order to determine the appropriate transformation for moving from the reference frame to the subsequent frame. The transformation thus indicates the change in position and rotation between the frames, i.e. so that the camera or image poses may be determined. The original DSO technique was based on monocular images. Details of the DSO process may be found in "Direct Sparse Odometry" by Engel et al., available on arXiv.org with reference arXiv: 1607.02565; the entire content of which is incorporated herein by reference. However, the preferred embodiments use a stereo DSO technique based on stereo images so that the image depths may be provided as input to the DSO algorithm to improve the tracking process (which generally (for DSO) requires existing images already having the correct depth estimates). The output of the stereo DSO process is thus a relative pose for each image compared to the first (reference) image. Further details of the stereo DSO process may be found in "Stereo DSO: Large-Scale Direct Sparse Visual Odometry with Stereo Cameras" by Wang et al., available on arXiv.org with reference arXiv: 1708.07878; the entire contents of which is incorporated herein by reference.

The output of the stereo DSO process also generally contains a "key point cloud" for each of the frames that are being processed (also referred to herein as a "sparse point cloud"). The sparse point cloud represents the positions of the various key points within each of the images. As mentioned above, the key points comprise the two-dimensional projections of the object onto a camera image. The sparse point cloud also includes the estimated depths for each of the pixels in the image.

In order to be able to better process the images, and in order to, for example, automatically detect or extract objects appearing in the images, a step of semantic segmentation may be performed in order to classify the elements of the images according to one or more of a plurality of different "object classes". Although other arrangements would be possible, typically an image is segmented in a pixel wise manner so that each individual pixel in the image is classified. Thus, in embodiments, at least some of the images (e.g. at least the key frames) may be processed in order to allocate an object class or list of classes (and associated probabilities) for each pixel in the images. In general, any suitable and desired semantic segmentation processes may be used to process and classify the image data. In preferred embodiments, the semantic segmentation of the image is performed using a machine learning algorithm. For instance, a trained convolutional neural network, such as the so-called "SegNet" or "PSPNet" systems, or modifications thereof, may suitably be used for the segmentation and classification of the image data. The object classes are generally defined within the semantic segmentation algorithm, and may, for example, include object classes such as "road", "sky", "vehicle", "traffic sign", "traffic light", "lane marking", and so on. SegNet and PSPNet are both known algorithms that have been developed specifically for classifying images of road networks. Suitable object classes, such as those described above, are therefore already defined in these algorithms. Further details of the SegNet architecture can be found in "SegNet: A Deep Convolutional Encoder-Decoder Architecture for Image Segmentation" by Badrinarayanan et al., available on arXiv.org with reference arXiv: 1511.00561; the entire contents of which is incorporated herein by reference. Further details of the PSPNet architecture can be found in "Pyramid Scene Parsing Network" by Zhao et al., available on arXiv.org with reference arXiv: 1612.01105; the entire contents of which is incorporated herein by reference.

Each pixel may be allocated a (single) object class based on the semantic segmentation. However, in embodiments, each pixel is allocated an object class vector, with the vector elements representing the likelihood (or probability) for that pixel belonging to each of the multiple different object classes.

This step of semantic segmentation may be referred to as a "vehicle environment" semantic segmentation, since the image is classified according to a plurality of general vehicle environment object classes.

In general, this step of semantic segmentation may be performed either before or after, or in parallel, with the step of visual odometry described above.

It will be appreciated that machine learning techniques need not be used to perform the semantic segmentation, and in other embodiments the images may alternatively, or additionally, be processed using image depth data, e.g. available when using a stereo camera, e.g. in order to classify pixels based on their relative depth in the image. For instance, in this way, e.g. using a stereo point cloud, the image may be segmented into ground level pixels, walls/housing, traffic sign poles, and so on. As another example, the image segmentation may use a sparse feature point cloud data, such as the DSO point cloud described above, and which may, for example, be used to generate a coarse ground mask containing (only) the "ground level" points.

Once the image has been classified in this way, e.g. using an algorithm as described above, the object class or classes determined from the semantic segmentation can then be made available for any subsequent processing steps, which might use only a certain subset of the object classes. For instance, any elements in the image corresponding to a certain object class may be extracted, or grouped together, and then processed separately from the other elements. For instance, in order to create a landmark observation feature, as described further below, the system will generally only need to consider pixels or groups of pixels that have been allocated a "landmark" type object class. (It will be understood that the semantic segmentation may not, and typically will not, contain a general "landmark" class, but rather a number of classes such as a "building" class, a "traffic sign" class, etc., that are each generally indicative of different types of "landmarks". Thus, any reference to a landmark class herein should typically be understood as meaning any one of a plurality of landmark-type classes).

Thus, any pixels within the same object class may be extracted or processed together, to produce an object "filtered" image. Similarly, groups of adjacent pixels within the same class may be associated together as features or "objects", which can then be extracted independently of one another and used in subsequent processing steps.

In embodiments, at least some of the images are processed in order to detect (and extract) one or more landmark object features for inclusion into the local map representation. In general, a landmark object feature may comprise any feature that is indicative or characteristic of the environment of the road network and that may be suitably and desirably incorporated into the local map representation, e.g. to facilitate the matching and/or aligning of the local map representation with a reference map section. For instance, the image content will generally include whatever objects are within the field of view of the camera or cameras used to obtain the images and any of these objects may in principle be extracted from the images, as desired. However, typical landmark objects that may suitably be extracted and incorporated into the local map representation may include features such as buildings, traffic signs, traffic lights, billboards and so on.

In general, a landmark object may be detected in an image in any suitable and desired way, e.g. using various automatic visual feature detection techniques. However, in embodiments, the landmark object features may be detected using the object class or classes allocated by the vehicle environment semantic segmentation described above. For instance, any pixels, or groups of pixels, in an image that have been allocated an object class corresponding to a landmark may be identified on that basis as being regions of interest, i.e. regions that may (potentially) contain a landmark. In this way, the semantic segmentation may be used directly to detect and identify various landmark objects within the image(s). For instance, using the object classes (or class vectors) determined during the semantic segmentation, any regions (or pixels) of interest in the image, e.g. that have been allocated a landmark object class, can be extracted from the image. The region or regions of interest may then be further processed in order to detect the boundaries of the one or more landmarks in a, or each, image. For instance, for each image that is being processed, a list of one or more bounding areas may be generated containing the detected one or more landmarks.

After the first step of vehicle environment semantic segmentation is performed on the images, as described above, and one or more regions of interest are determined as potentially containing a landmark object on the basis of the first semantic segmentation, a second or further step of semantic segmentation (or object detection and classification) may be performed specifically on the determined regions of interest. That is, a further specific classification step may be performed on any regions of interest determined to contain a landmark in order to further refine the landmark classification. That is, once one or more landmarks have been detected in the image(s), a further specific step of landmark recognition may be performed. In other words, the pixels from the original image data may be first classified according to a plurality of general object classes from the vehicle environment semantic segmentation. For any landmarks detected from the original image data, a further specific landmark recognition classification may be performed to refine the landmark detection. For instance, the landmark recognition may be used to refine the boundaries associated with each of the detected landmarks.

The landmark recognition, which may constitute a further semantic segmentation, may (although need not) be performed in a generally similar manner to the first (vehicle environment) semantic segmentation. Typically, a machine learning algorithm is used. For instance, in embodiments, a supervised learning method such as a support vector machine or neural network may be used to perform the landmark recognition semantic segmentation. However, for the purposes of the landmark recognition, the algorithm may be trained using specific landmark data, e.g. so as to provide a more specific and accurate landmark classification than would be achieved using the general vehicle environment semantic segmentation.

For any landmark objects that are detected (however this is done) in one or more of the images, a landmark observation feature may then be created for inclusion within the local map representation. That is, when the local map representation is generated, a feature representing the detected landmark may be included into the local map representation. A landmark observation feature typically comprises: a landmark location; a landmark orientation; and a landmark shape. Thus, in embodiments, the techniques may comprise processing the sequence of images to detect one or more landmark objects appearing in one or more of the images, and generating for each detected landmark object a landmark observation for inclusion into the local map representation, the landmark observation including information indicative of a position and orientation of the detected landmark. The information indicative of a position and orientation of the detected landmark may generally comprise a relative position and orientation of the landmark. For instance, the position and orientation of the detected landmark may generally comprise a relative position and orientation relative to (either) the road network itself, or to the vehicle, e.g. based on the vehicle's frame of motion, e.g. as determined from visual odometry. For example, in embodiments, a two-dimensional landmark shape, e.g. a polyline, may be generated for each landmark along with an orientation matrix for transforming the two-dimensional landmark shape into three-dimensional space suitable for incorporation into the local map representation. An image file describing the content can thus be generated for inclusion into the local map representation.

In general, as mentioned earlier, the same objects (e.g. landmarks) will appear multiple times in the sequence of images but viewed from a number of different perspectives. Thus, in order to aggregate the information from the plurality of images together, e.g. so as to be able to determine the position and orientation of a landmark within the road network (or relative to the vehicle), so that the landmark can be incorporated into the local map representation, it is generally necessary to know the camera poses for each of the images within which the landmark was detected (e.g. as may be determined using visual odometry). Thus, the landmark observation is typically generated using (at least some of) the sequence of images, as well as the bounding areas and object classes resulting from the landmark recognition (where this is performed), and also the camera poses for the images in which the landmark has been detected. The position and orientation of the landmark may then be determined in any suitable way based on the camera poses, e.g. using known visual odometry techniques for object pose estimation. For instance, generally, the position and orientation of the landmark may be determined based on triangulation using multiple of the images and the associated camera locations at which the images were obtained. Thus, in embodiments, the techniques involve processing at least some of the images to detect one or more landmark objects appearing in the images; and generating, for each detected landmark, a landmark observation for inclusion into the local map representation, wherein the landmark observation includes information indicative of a position and orientation of the detected landmark, wherein the position and orientation of the detected landmark is determined by triangulation using a plurality of images in which the landmark was detected and the associated camera locations thereof.

In some embodiments, different cameras may be used for the purposes of determining the vehicle's odometry and for detecting features, such as landmarks and lane markings. For example, in embodiments, one or more stereo cameras may be used for the visual odometry, whereas one or more single (mono) cameras are used for the feature detection. In this case, a step of odometry transfer may be performed in order to determine the poses of the images used for the landmark detection based on the results of the visual odometry, e.g. by treating these images as rotations and/or translations of the images used for the visual odometry process. In embodiments where different cameras are used for visual odometry and feature detection, a first camera may be a monochrome camera and a second camera may be a multichrome (or colour) camera. For example, one or more monochrome cameras may be used to acquire (monochrome) images for visual odometry, whereas one or more multichrome cameras may be used to acquire (colour) images for feature detection.

In order to improve the accuracy with which landmarks can be detected, and with which landmark observations may be generated, detected landmark objects may be carefully tracked within the sequence of images, and then compared with other detections (i.e. of the same landmark object) from different images in order to try to identify (and filter out) any false detections. For instance, if a landmark object (such as a traffic sign) appears in one frame, it would be expected that the landmark would also appear in the adjacent images, i.e. either side of the image in which the landmark was detected. On the other hand, for an inaccurate or false positive detection, this may not be the case. Thus, for each landmark object detection in each image, the detected landmark may be carefully tracked with respect to its perspective distortion within a range of adjacent images (forwards and backwards in the sequence). The tracking may generally be performed using any suitable motion model based on the (previously determined or known) relative positions and poses of the different images. For example, in embodiments, a Kanade-Lucas-Tomasi (KLT) feature tracker may be used. In embodiments, instead of using a traditional affine transform KLT tracker, a homographic extension of the KLT tracker (HKLT) may be used. The result of the tracking is comprised of a set of perspective transformations that describe the ideal mapping of the detected landmark from the image in which the landmark was detected to the range of images based on the relative poses of the images. This mapping thus gives a representation of the detected landmark in the real-world (three-dimensional) space in the form of a 'track' that extends through the range of images in the sequence. In turn, this allows the detected landmark to be triangulated in three-dimensional space, e.g. to give a triangulated contour of the landmark in the coordinate system of the vehicle's odometry. These steps may be performed for each detected landmark in each frame. Accordingly, this results in many triangulated contours for each detected landmark (i.e. one for each frame in which the landmark was detected), with these contours roughly overlapping (depending on the tracking quality). The three-dimensional (3D) representations may then be grouped and any outliers removed. This grouping thus provides a false positive filter, as false positives, or otherwise inaccurate landmark detections, will tend to appear scattered in three-dimensional space, whereas true landmarks will tend to line up in three-dimensional space from frame to frame. Thus, in embodiments, the techniques may comprise processing at least some of the images to detect one or more landmark objects within the images; for each landmark object detected in each image of the sequence of images, determining using the associated camera locations of the images a set of transformations for mapping the detected landmark from the image in which it was detected into one or more adjacent images of the sequence of images; for each landmark object detected in each image of the sequence of images, generating based on the mapping a representation of the landmark in a three-dimensional coordinate space; and grouping the three-dimensional representations together so that each group contains a set of three-dimensional representations corresponding to the same physical landmark but recorded in different images.

It is believed that this method for identifying landmarks is novel and advantageous in its own right.

Thus, from a further aspect, there is provided a method for identifying one or more landmarks within an environment of a road network, the method comprising:

obtaining, from one or more cameras associated with a vehicle travelling through the road network, a sequence of images reflecting the environment of the road network on which the vehicle is travelling, wherein each of the images has an associated camera location at which the image was recorded;

processing at least some of the images to detect one or more landmark objects within the images, wherein the landmark objects represent landmarks in the environment of the road network;

determining, for each landmark object detected in each image of the sequence of images, and using the associated camera locations of the images, a set of transformations for mapping the detected landmark object from the image in which it was detected into one or more adjacent images of the sequence of images;

generating, for each landmark object detected in each image of the sequence of images, a representation of the landmark object in a three-dimensional coordinate space;

determining a set of three-dimensional representations generated from different images that correspond to the same landmark in the environment; and generating, from the determined set of three dimensional representations, data indicative of the landmark in the environment represented by the set of three dimensional representations.

The method according to this aspect may comprise any of the features described above in relation to the other aspects and embodiments of the present invention. For example, the tracking may generally be performed as described above using a KLT tracker, or similar.

The present invention also extends to a system for carrying out a method in accordance with this aspect of the invention, or any of its embodiments, herein described.

Thus, from another aspect, there is provided a system for identifying one or more landmarks within an environment of a road network, the system comprising:

means for obtaining, from one or more cameras associated with a vehicle travelling through the road network, a sequence of images reflecting the environment of the road network on which the vehicle is travelling, wherein each of the images has an associated camera location at which the image was recorded;

means for processing at least some of the images to detect one or more landmark objects within the images, wherein the landmark objects represent landmarks in the environment of the road network;

means for determining, for each landmark object detected in each image of the sequence of images, and using the associated camera locations of the images, a set of transformations for mapping the detected landmark object from the image in which it was detected into one or more adjacent images of the sequence of images;

means for generating, for each landmark object detected in each image of the sequence of images, a representation of the landmark object in a three-dimensional coordinate space;

means for determining a set of three-dimensional representations generated from different images that correspond to the same landmark in the environment; and means for generating, from the determined set of three dimensional representations, data indicative of the landmark in the environment represented by the set of three dimensional representations.

This further aspect of the present invention can and preferably does include any one or more or all of the preferred and optional features of the invention described herein in respect of any other aspects or embodiments of the invention, as appropriate. For example, even if not explicitly stated, the system may comprise means for carrying out any step or steps described in relation to the method herein in any of its aspects or embodiments, and vice versa. The means for carrying out any of the steps described in relation to the method or system may comprise one or more processors and/or processing circuitry. The present invention is therefore preferably a computer implemented invention, and any of the steps described in relation to any of the aspects or embodiments of the invention may be carried out under the control of a set of one or more processors and/or processing circuitry.

The result of grouping three-dimensional representations from different images is that each of the groups contains a set of substantially overlapping representations, which can thereby be associated with the same physical landmark detected in multiple different frames. That is, any three-dimensional representations that are associated with the same physical landmark will generally be expected to line up in the coordinate space and may thus be grouped together on this basis. However, any three-dimensional representations that are based on inaccurate detections will appear scattered in the coordinate space, and may thus be discarded as outliers (and not included in the groups). The grouping therefore allows any false positive, or otherwise inaccurate, landmark detections to be removed in order to provide a more accurate identification of the landmarks.

The three-dimension representations in each group may then be fused together to determine a single two-dimensional contour of the landmark and/or to generate a reconstruction of the landmark in the coordinate space. The fused three-dimensional contours may allow the landmark to be more accurately located and cut-out from each image (frame). By overlaying the cut-outs, a fused image of the sign can thus be created. In this way, defects like occlusions or specular highlights can be removed from the image of the landmark and it is also possible to more reliably detect the boundaries of the landmark, e.g. by masking pixels that have high colour variance between the cut-outs. The pixel contours of the masked cut-out may be vectorised to provide a more accurate three-dimensional representation of the landmark shape, pixel content and position with respect to the vehicle's odometry. This accurate representation may then be used for localisation, e.g. by associating the representation obtained from the images with a reference landmark shape in the reference map.

The data indicative of a landmark in the environment generated by the method, which is also referred to herein as a "landmark observation", preferably at least one, some or all of: a location of the landmark in the environment; an orientation of the landmark in the environment; a two-dimensional (2D) polyline representing the shape of the landmark; a pose matrix that, when applied to the 2D polyline, transforms the polyline into the 3D coordinate space (representative of the environment); and an image describing the content contained in the 2D polyline.

In embodiments, a "ground mesh" is generated from the sequence of images. For instance, a "ground mesh" image may be generated containing (only) the ground-level features in the area that the vehicle is travelling. The ground mesh may be generated using the object class(es) obtained from the vehicle environment semantic segmentation, e.g. by extracting or using any pixels that have been allocated ground-level object classes (such as "road", "road marking", "lane marking", and so on). However, the semantic segmentation may not be perfect, and in some cases the semantic segmentation may give some false values, i.e. selecting some points as ground-level points even when they are not on the ground. Thus, in embodiments, in order to improve the accuracy of the ground mesh generation, a point cloud may be used to further filter or select the ground points. The point cloud may be used either by itself, or preferably in combination with the object classes from the vehicle environment semantic segmentation. For instance, the ground mesh may be generated using a sparse point cloud as output from the DSO process described above. However, alternatively, or additionally, the ground mesh may be generated using a stereo point cloud obtained directly from the stereo images using the pixel depths. For instance, due to the sparsity of the DSO point cloud, it may be beneficial to use the stereo point cloud to supplement the DSO point cloud. For instance, the stereo point cloud may be used to interpolate the elevation where there is insufficient data in the DSO point cloud, and otherwise use the DSO point cloud. Alternatively, if the DSO point cloud is too sparse, the stereo point cloud may be used instead of the DSO point cloud. In general, various suitable techniques are contemplated for generating a ground mesh.

The ground mesh may in turn be used to generate an orthorectified image of the ground-level features of the road network. Generally speaking, an orthorectified image is a "scale corrected" image, depicting ground features as seen from above in their exact ground positions, preferably in which distortion caused by camera and flight characteristics and relief displacement has been removed using photogrammetric techniques. An orthorectified image is a kind of aerial photograph that has been geometrically corrected ("orthorectified") such that the scale of the photograph is uniform, meaning that the photograph can be considered equivalent to a map. An orthorectified image can be used to measure true distances, because it is an accurate representation of the earth's surface, having been adjusted for topographic relief, lens distortion, and camera tilt. Orthorectified views differ from perspective view as an orthorectified view project at a right angle to a reference plane, whereas perspective views projects from the surface onto the reference plane from a single fixed position. An orthorectified image can be obtained by any suitable map projection. The map projection can be a projection by surface, such as cylindrical, pseudo cylindrical, hybrid, conical, pseudo conical or azimuthal. The projection can also be a projection by preservation of a metric property. The map projections have in common that they are orthogonal projections, which means that every pixel represents a point on the surface of the reference plane (ellipsoid that approximates the shape of the earth) seen along a line perpendicular to that surface. Thus, every pixel of an orthorectified image of the earth surface substantially corresponds to a view of the earth surface seen along a line perpendicular to the ellipsoid that approximates the shape of the earth. An orthorectified image comprises metadata enabling an algorithm to reference any pixel of the orthorectified image to a point in the geographic coordinate reference system. As the exact position on the ellipsoid that approximates the shape of the earth of each pixel is known, the position and size of ground features, e.g. horizontal road information, can be retrieved from an orthorectified image.

In embodiments, the orthorectified road image may comprise a bird's eye mosaic including a top down view of the area within which the vehicle is travelling in which features extracted from the images are projected onto the ground mesh and blended together. For instance, each of the recorded images can be projected back onto the ground. Using knowledge of the camera pose associated with an image, it is thus possible to project the image onto the ground from a number of different perspectives. This can be done for multiple different images, and the resulting projections from the various different perspectives can then be superposed and blended together. The superposition of all of the projected images onto the ground thus generates an image reproducing the appearance of the ground and that can then be viewed from any perspective as desired (e.g. a bird's eye view). Alternatively, or additionally, the orthorectified road image may comprise a linearly registered image containing a straightened view of the trip, e.g. as determined from the bird's eye mosaic. The generation of the linearly registered image (LRI) may typically comprise generating evenly spaced slices along the trajectory of the camera (i.e. the vehicle's ego motion) that are perpendicular to the trajectory. Further details concerning the generation of a LRI can be found in WO 2009/045096 A1 entitled "Method of capturing linear features along a reference-line across a surface for use in a map database"; the entire contents of which is incorporated herein by reference. A height map of the ground mesh can then be generated to allow the height to be sampled at any arbitrary point. The linearly registered image may then be rendered by projecting the camera images onto the ground, in a similar manner as described above, by producing a sample height map along the slices and projecting each sample point onto the camera images that see the sample point and then averaging the pixel values appropriately to produce a blended image. An image mask may be used when generating the orthorectified road image in order to remove any extraneous or unwanted features (e.g. the vehicle's bonnet) that may be determined from the vehicle environment semantic segmentation.

In embodiments, an orthorectified road image is generated in which the pixel value of each pixel in the image represents the colour of the location in environment detected from the images used to generate the road image. Each pixel value therefore preferably comprises a vector with multiple values, e.g. three values when using an red-green-blue (RGB) colour space.

Additionally, or alternatively, an orthorectified road image is generated in which the pixel value of each pixel in the image represents the probability of the location in the environment being a lane marking object, as output from the vehicle environment semantic segmentation. For example, when using a greyscale colour space, any pixels that have been allocated a 100% probability of being a lane marking object may be 'white', while any pixels with a 0% probability may be 'black', with the other pixel values being selected appropriately based on the respective probabilities. In this way, a "filtered" greyscale orthographic road image can be generated that highlights the lane marking objects, and which offers a clearer image on which to perform lane marking semantic segmentation. This image may then be subject to a specific step of lane marking semantic segmentation to classify pixels according to specific lane marking type classes, or be subject to lane marking objection detection and recognition, e.g. using a trained convolutional neutral net, to identify and classify objects in the image as specific types of lane markings. Examples of lane marking classes can include one or more of: single solid lines, single short dashed lines, single long dashed lines, double solid lines, double dashed lines, island borders, etc.

It is believed that this method of identifying lane geometries is novel and advantageous in its own right.

Thus, from a yet further aspect, there is provided a method of determining a location and geometry of lane markings on one or more roadways of a road network, the method comprising:

obtaining, from one or more cameras associated with a vehicle travelling through the road network, a sequence of images reflecting the environment of the road network within which the vehicle is travelling, wherein each of the images has an associated camera location at which the image was recorded;

processing at least some of the images to perform semantic segmentation, such that each pixel of the processed images is allocated at least a probability value that the pixel represents a lane marking in the environment;

processing at least some of the images of the sequence of images to generate a road image representing an area of the road network within which the vehicle is travelling, wherein the pixel value for each pixel in the road image is based on the allocated probability values of the corresponding pixels in the images used to generate the road image;

processing the road image to detect and classify one or more lane marking objects within the image, wherein the lane marking objects represent lane markings on the one or more roadways depicted in the road image; and processing the road image, using the detected and classified lane marking objects, to determine the location and geometry of the lane markings represented by the lane marking objects.

It will be appreciated that the method according to this aspect may generally comprise any of the features described above in relation to the other aspects and embodiments of the present invention, at least to the extent that they are not mutually exclusive.

The present invention also extends to a system for carrying out a method in accordance with this aspect of the invention, or any of its embodiments, herein described.

Thus, from a yet further aspect, there is provided a system for determining a location and geometry of lane markings on one or more roadways of a road network, the system comprising:

means for obtaining, from one or more cameras associated with a vehicle travelling through the road network, a sequence of images reflecting the environment of the road network within which the vehicle is travelling, wherein each of the images has an associated camera location at which the image was recorded;

means for processing at least some of the images to perform semantic segmentation, such that each pixel of the processed images is allocated at least a probability value that the pixel represents a lane marking in the environment;

means for processing at least some of the images of the sequence of images to generate a road image representing an area of the road network within which the vehicle is travelling, wherein the pixel value for each pixel in the road image is based on the allocated probability values of the corresponding pixels in the images used to generate the road image;

means for processing the road image to detect and classify one or more lane marking objects within the image, wherein the lane marking objects represent lane markings on the one or more roadways depicted in the road image; and means for processing the road image, using the detected and classified lane marking objects, to determine the location and geometry of the lane markings represented by the lane marking objects.

This further aspect of the present invention can and preferably does include any one or more or all of the preferred and optional features of the invention described herein in respect of any other aspects or embodiments of the invention, as appropriate. For example, even if not explicitly stated, the system may comprise means for carrying out any step or steps described in relation to the method herein in any of its aspects or embodiments, and vice versa. The means for carrying out any of the steps described in relation to the method or system may comprise one or more processors and/or processing circuitry. The present invention is therefore preferably a computer implemented invention, and any of the steps described in relation to any of the aspects or embodiments of the invention may be carried out under the control of a set of one or more processors and/or processing circuitry.

The identified lane markings resulting from the lane marking detection and classification, which can include a further semantic segmentation step, can thus be used to create lane marking observations for incorporation into the local map representation. For instance, the lane marking observation may include the detected lane marking objects in the area of the road network within which the vehicle is travelling. Thus, the lane geometries can be incorporated into the local map representation (and/or the reference map, when updating based on the same).

As described above, the ground mesh and orthorectified road images are used to generate lane observations. However, it will be appreciated that a ground mesh and/or orthorectified road image may be generated purely for visualisation purposes, and does not necessarily need to be used in a subsequent step of lane observation feature creation.

According to the present invention, a local map representation is using at least some of the obtained images and the associated camera locations. The local map representation generally represents an area of the road network within which the vehicle is travelling. In embodiments, the local map representation may comprise an orthorectified image of the area of the road network, which may be generated substantially as described above. Preferably, the local map representation comprises a ground mesh and/or orthorectified road image as described above. In principle, the local map representation may comprise only the ground mesh and/or orthorectified road image. However, preferably, the local map representation also includes one or both of the lane observations and landmark observations as described above. For instance, the lane marking objects and/or landmarks may suitable be embedded into the ground mesh and/or orthorectified road image, appropriately, to build up the local map representation. Alternatively, the local map representation comprises one or both of the lane observations and landmark observations, e.g. without the ground mesh and/or orthorectified road image.

Thus, the local map representation that is generated generally comprises an image of the road network and the environment of the road network in the area that the vehicle is travelling. The local map representation may comprise a top-down two-dimensional image showing the environment of the road network in that area. However, the local map representation could also comprise a three-dimensional image showing the environment of the road network in that area. The local map representation may also include one or more features that are embedded into, or on top of, the image. In some cases, the local map representation may also include one or more "key" images (or frames). For instance, the local map representation may include one or more of the plurality of images obtained from the camera(s) associated with the vehicle.

The local map representation, once generated, is then compared, or matched, to a reference map section. The reference map section is a section that covers at least the area of the road network within which the vehicle is travelling, i.e. the area at which the images have been obtained. In principle, the comparison could be made based on the entire (global) map within the internal map repository. However, in practice, the reference map section may be chosen based on an approximate, or coarse, knowledge of the location of the vehicle, e.g. as may be obtained using GNSS or other positional data, or from a previous localisation result. Thus, the area of the reference map section may substantially or approximately correspond to the area of the road network within which the vehicle is (currently) travelling.

For instance, the local map representation may be aligned with a corresponding reference map section. Any features that are included in the local map representation, such as the landmark observations and road/lane geometries described above, may in general be used to perform this matching. In general, the alignment may be performed in any suitable and desired way. For instance, where the local map representation comprises an image of the road network, the image may then be compared, e.g. in a pixel (or block) wise manner against a reference map image in order to perform the desired matching. Alternatively, where the local map representation includes one or more of the plurality of images obtained from the camera(s) associated with the vehicle. These key images may then be compared with images stored in the reference map, e.g. by suitably transforming the images to align with those in the reference map. However, preferably, the comparison comprises matching and/or aligning the positions of one or more features, e.g. landmarks and/or lane markings, of the local map representation with the positions of the corresponding features in the reference map section. In this way, the transformations required to move from the vehicle's frame of reference into the reference map frame can be determined. Based on this matching, an accurate geographical location and orientation of the vehicle within the road network may thus be determined.

Alternatively, or additionally, as described above, the matching may be used for the purposes of map generation and/or updating a map. For instance, when the matching indicates that the reference map section is out of date or contains one or more errors, e.g. where the local map representation contains one or more features that are not present in the reference map section, or where the local map representation shows that one or more features have changed, or are no longer present in the environment of the road network, the reference map may be updated accordingly.

The reference map section may be extracted from a map repository. The map repository may generally be stored in a memory accessible by the processor, and may contain a pre-compiled or downloaded electronic map that generally covers (at least) the area within which the vehicle is travelling. That is, the map repository may be local to the vehicle. However, in embodiments, the reference map is stored and maintained on a global (third party) map repository, e.g. located in the cloud, so that the reference map can be downloaded by a user of the vehicle (or automatically by the vehicle itself). In this case, the data generated by a plurality of different vehicles travelling within the road network can be used to update the global map repository, e.g. as described herein.

In embodiments, the techniques presented herein may be performed substantially in real-time, i.e. to localise a vehicle as it traverses the road network, e.g. for the purposes of autonomous navigation or driving. Thus, the area may be the area of the road network within which the vehicle is currently travelling. However, in principle the present techniques could be applied to off-line or historic data, e.g. for calibration or map generating purposes, in which case the area may represent an area for which the vehicle was travelling at the time at which the plurality of images were obtained. The local map representation may be considered as a "georeferenced" observation of the environment of the road network at which the images were obtained. That is, the images may be obtained at a generally known location (i.e. within a known, coarsely defined area), and the local map representation may thus be used to build up an observation of the environment at the known location.

The localisation and mapping techniques described herein may be performed entirely by an off-board processor (i.e. remotely from the vehicle). For instance, the image data obtained by the one or more cameras associated with the vehicle may be transmitted to an off-board processer, that upon receipt of the image data, proceeds to determine the geographical location and orientation of the vehicle within the road network (e.g. and then return this information to the vehicle, as desired). At least some of the processing may be performed in the cloud. However, in embodiments, at least some of the steps may be performed by a processor on board the vehicle. In general, it is contemplated that the various processing steps described herein may be distributed between an on-board processor of the vehicle and off-board processors in various suitable ways, as desired. For instance, in some examples, a system is provided including an autonomous vehicle comprising one or more cameras, an on-board processor and a wireless communication module for communicating with a remote server and/or processor. The image data obtained by the cameras may then be processed in part by the on-board processor, or transmitted to the remote server and/or processor for processing. The internal map repository may be stored locally or remotely. In either case, the internal map repository may be updated regularly using either data obtained from the vehicle according to the techniques presented herein, as well as from other vehicles within the road network, and/or central updates provided by the map repository owner.

From another aspect of the present invention, there is provided a method for determining a geographical location and orientation of an observer, comprising, in a positioning system: providing a plurality of images recorded at a known location; aggregating the plurality of images into a consistent local map representation of the scenery at the known location; extracting a reference map section from a previously compiled internal map repository, an extent of the reference map section corresponding to an approximate area potentially covered by the plurality of images; matching and aligning the local map representation of the scenery against the reference map section; providing selected source data, such as image sequence key frames and recognized object information, for map creation and/or updating purposes to the internal map repository; and determining a geographical location and orientation from the matching.

In embodiments, the aggregating of the plurality of images further comprising using a first set of features for performing a 3D reconstruction under the assumption that all images from the plurality of images are depicting one and the same scenery from different points of view (Structure from Motion assumption).

The method may further comprise using the local map representation for extracting a secondary set of features, and using secondary set of features for the matching and aligning. In embodiments, the secondary set of features is comprised of at least one of the following:
  a 3D representation of features of the scenery (sparse point cloud);
  a 2D top-view map of detected landmarks and high-level features, such as lane markings, ground types or objects such as traffic lights, traffic signs, trees, sewer covers, etc. (orthomap); and
  a 2D top-view dense reconstruction, such as synthetic aerial photos (orthophoto).

The method as described above may be used for generating an electronic map. Thus, a further aspect of the present invention relates to the use of a method as described above for generating an electronic map.

From yet another aspect of the present invention, there is provided a positioning system, comprising a camera, and an on-board processing unit, the system being configured for determining a geographical location and orientation of an observer by the method according to at least one of the preceding claims.

The various functions of the technology described herein can be carried out in any desired and suitable manner. For example, the steps and functions of the technology described herein can be implemented in hardware or software, as desired. Thus, for example, unless otherwise indicated, the various processors, functional elements, stages, and "means" of the techniques described herein may comprise any suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner. For example, the means for carrying out any of the steps of the method according to any of the aspects or embodiments described herein may generally comprise a set of one or more processors (or processing circuitry) configured, e.g. programmed with a set of computer readable instructions, for doing so. A given step may be carried out using the same or a different set of processors to any other step. Any given step may be carried out using a combination of sets of processors. The system may further comprise data storage means, such as computer memory, for storing, for example, the at least one repository including the instructive and informative data. Any of the methods in accordance with the present invention may be implemented at least partially using software, e.g. computer programs. The present invention thus also extends to a computer program product comprising computer readable instructions executable to perform, or to cause a system and/or server to perform a method according to any of the aspects or embodiments of the invention. Thus, the present invention extends to a, preferably non-transitory, computer program product comprising computer readable instructions executable when run on a system in accordance with any of the embodiments of the invention to cause a set of one or processors of the system to perform the steps of any of the aspects or embodiments of the method described herein.

It will be appreciated that any of the further aspects of the invention may include any or all of the features of the invention described in relation to any other aspects and embodiments of the invention to the extent they are not mutually inconsistent therewith. In particular, it will be appreciated that the invention in the second and further aspects may comprise any or all of the features described in respect of the method of the first aspect of the invention, and vice versa. Thus, if not explicitly stated, the method may comprise the steps of performing any (or all) of the functions described in relation to the system or apparatus, and the system of the invention may be arranged to perform any (or all) of the method steps herein described. For instance, the system may comprise a set of one or more processors that are operable or configured to carry out the steps mentioned. Any step may be carried out by any one of the processors, or by multiple processors.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the technology described herein will now be described by way of example only and with reference to the accompanying drawings, in which:

FIG. 9 shows an example of a semantic segmentation approach that may be used in embodiments of the present invention to classify the images according to object class;

FIGS. 10 to 15 illustrate how a landmark object such as a traffic sign can be tracked and traced from frame to frame;

FIG. 22 provides an illustration of Unit A (of FIG. 5) according to an embodiment of the invention; and FIG. 23 provides an illustration of Unit C (of FIG. 5) according to an embodiment of the invention.

DETAILED DESCRIPTION OF THE PREFERRED EMBODIMENTS

Figure 1:
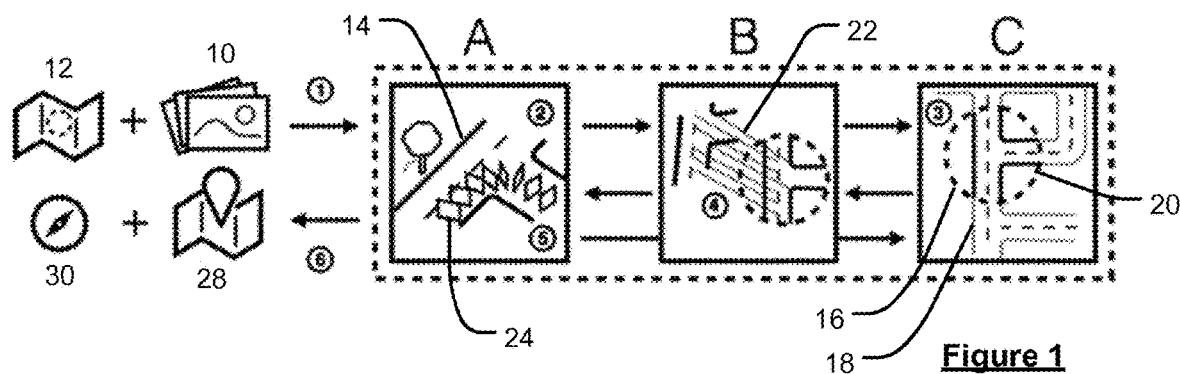
FIG. 1 illustrates the concept of a visual global positioning and mapping system according to an embodiment of the present disclosure showing how an image sequence and an approximate location at which the image sequence was recorded, aggregated into a local map, can then be compared with a reference map section extracted from a map repository, having section extents (area) roughly corresponding to the aggregated local map, and used to determine a geo-location and orientation based on the recorded image sequences, as well as identifying key frames and object information that may be used to update the map repository.

The present disclosure generally relates to providing improved technologies for determining a geographical location and orientation of an observer (vehicle), e.g. within a road network that is covered by a pre-built map. In embodiments, the present disclosure thus relates to techniques for Large-Scale Visual Geo-Localisation and Mapping, as will be explained below. The localisation techniques of the present disclosure may for instance be used to facilitate various autonomous driving functionality or to supplement or generate improved electronic maps, e.g. for use with autonomous driving. For instance, as explained above, autonomous driving typically requires the use of a map that provides at least information regarding the lane geometry in the locality of the vehicle, e.g. the lane centre lines and lane connectivity (rather than just the road centre lines, as may be provided in a standard digital map, e.g. for use by standard portable navigation devices, e.g. for use by nonautonomous vehicles).

That is, what is required is a high-definition (HD) map that allows localisation to a high degree of accuracy. The HD map also needs to be update (or at least updateable) frequently to reflect changes such as lane closures, roadworks and updated speed limits, etc. As well as showing the lane geometry, which is the minimum requirement for autonomous driving, the HD maps may also typically include landmarks, such as traffic signs, traffic lights, billboards, etc., which may be used to help with localisation (and of course also for other purposes). These landmarks may typically be defined by: a position of the landmark, the landmark dimensions (e.g., height, width); and an image of the landmark, e.g. from the front of the landmark, e.g. the face that makes it useful as a landmark.

The generation and maintaining of such HD maps thus helps facilitate various autonomous driving functionalities. For example, the HD maps may enable path planning, aid perception, and allow an autonomous vehicle to see and anticipate the road ahead even beyond the range of its sensors. The use of such HD maps is not limited to autonomous vehicles, and can also be leveraged to fulfill a broad range of advanced driver assistance system (ADAS) applications such as predictive powertrain control, eco-routing and curve speed warnings. However, it will be that the HD maps described herein may find particular utility for facilitating autonomous driving, and embodiments of the present disclosure will therefore be described in the following in this context.

In particular, the techniques of the present disclosure involve generating "georeferenced" observations of the local environment within which a vehicle is travelling. The georeferenced observations are sensor derived observations of the local environment of the road network within which the vehicle is currently a travelling. For instance, a camera that is located on or in a vehicle travelling on a road network may be used to obtain images relating to the road network in the vicinity of the vehicle, and these images may then be processed in order to extract certain features indicative of the environment of the road network in this area. The georeferenced features, or observations, extracted from the images can then be incorporated into a suitably local map representation that allows for a comparison with a previously-compiled reference map of the area. This comparison allows the vehicle to be accurately localised within the area. Furthermore, when the comparison identifies errors in the reference map, the reference map may then be updated accordingly.

FIG. 1 illustrates the concept of a visual global positioning and mapping system that may be provided according to the present disclosure. The introduced Visual Global Positioning System (V-GPS) provides an approach to determine the global position and orientation of an observer using visual cues in images. This is done by examining recorded imagery for the purpose of aggregating a "local map" which is then matched with a reference map of the area. This reference map has been compiled previously by using parts of the same approach as Visual Global Mapping System (V-GMS).

Functional Principle of the Visual Global Positioning and Mapping System

With reference to FIG. 1, the principle of the illustrated visual global positioning and mapping system, at least according to one example, may be summarised according to the following steps:

1. An image sequence 10, recorded at a known approximate location 12 (±100 m), is provided as the system's input for the V-GPS/V-GMS.
2. The image sequence 10 is aggregated into a consistent, condensed and characteristic local map representation 14 of the scenery.
3. A reference map section 16 is extracted from the previously compiled internal map repository 18. The reference map section's extents 20 correspond to the approximate area of the recorded image sequence.
4. The local map representation 14 of the scenery is then matched and aligned against the reference map section 16 (given that the reference map provides sufficient coverage) to determine various correspondences 22 between the local map representation 14 and the reference map section 16.
5. Selected source data, such as image sequence key frames 24 and recognised object information 26, is provided for map creation and updating purposes to the internal map repository 18.
6. A geo-location 28 and orientation 38 is derived from the matching transformation and returned as response and the system's output.

As depicted in FIG. 1 and unlike traditional Visual Geo-Localisation Systems, V-GPS/V-GMS does not attempt to use features directly extracted from image material for localisation purposes. Instead the localisation procedure introduces an intermediate step of generating a local map representation.

For instance, at least in some examples, a consistent local map representation is aggregated by using a first set of features for performing a 3D reconstruction under the assumption that all input images depict the same scenery from different points of view (i.e. a Structure from Motion assumption). This produces an aggregated local map, from the most recent images, which is more useful than the mere input images. It is comprised of the images, the observer's 3D poses during the capture of each image and a sparse point cloud of the surroundings.

More importantly, this represents the system's cleaned-up coherent perception of the local horizon, where all of the input image's content that is not in accordance with this static scenery is automatically omitted/filtered out. This cleaned up model of the world is invariant to dynamic objects or the particular trajectory of the camera.

Next, this local map representation is used to embed and extract a secondary set of features, which are in turn used for matching, alignment and localisation purposes. This set of features may be comprised of but is not limited to: a 3D representation of the scenery's features (sparse point cloud); a 2D top-view map of detected landmarks and high-level features, such as lane markings, ground types or objects such as traffic lights, traffic signs, trees, sewer covers, etc. (orthomap); and/or a 2D top-view dense reconstruction, such as synthetic aerial photos (orthophoto).

The localisation system described above roughly works by visually aligning camera images to recover the 3D geometry of the surrounding area, from which the locations of second level features are determined.

The Visual Global Mapping System is a new method for building a global map from overlapping local maps by going the other way: by matching multiple local maps via the second level features, inconsistencies between these local maps are found. These inconsistencies are ameliorated by feeding back corrections into the particular camera poses. This allows a global map to be built which is particularly precise and globally consistent at the same time.

Therefore, the V-GPS/V-GMS approach described above can be characterized as a hybrid approach in that it combines traditional image content and image feature-based Structure from Motion/Visual Odometry techniques with regular object and landmark recognition methods as used in Large-Scale Visual Geo-Localisation Systems. In this way, V-GPS/V-GMS harnesses the local stability and accuracy derived from volatile low-level features and likewise the global stability and durability of high-level feature matching for localisation purposes.

The system may generally divided into three independently configurable sub-systems, or units, as follows:

Unit A—Local Map Aggregation & Object Detection: Image and sensor data processing, image information extraction and aggregation of the characteristic local map.

Unit B—Global Map Lookup & Pose Estimation: Localisation by matching an aggregated local map with a corresponding reference map section Unit C—Global Map Creation & Update: Map creation & update, pre-processing and provisioning of reference maps for localisation purposes.

These sub-systems may be provided on-board a vehicle that is to be localised. However, typically, at least some of the processing is distributed remotely, e.g. performed in the cloud. Some exemplary system configurations will now be described.

V-GMS Map Creation and V-GPS Odometry Support in Autonomous Vehicles

Figure 2:
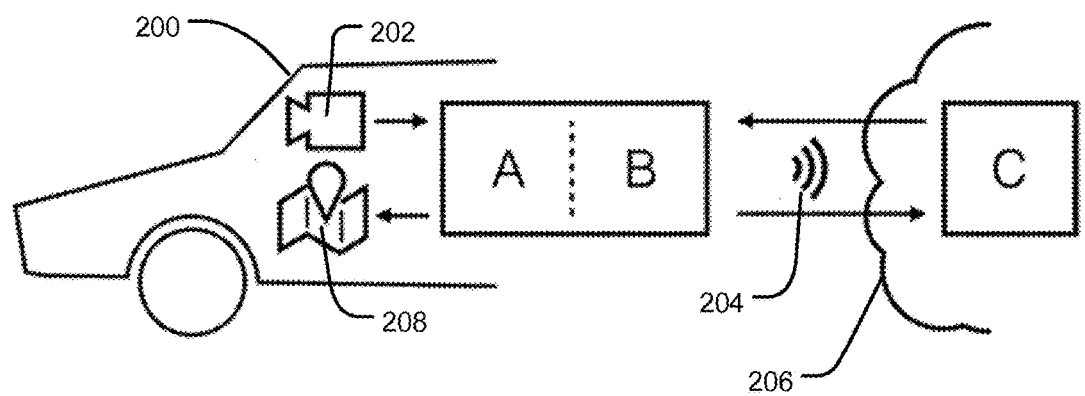
FIG. 2 shows schematically an example of a combined visual global mapping system (V-GMS) and visual global positioning system (V-GPS) for providing odometry support in autonomous vehicles.

FIG. 2 shows an autonomous vehicle system 200 equipped with a camera sensor input, and a high-bandwidth wireless internet connection to a cloud-computing environment 206. Thus, the autonomous vehicle is equipped with a monocular or stereo camera 202; a high-end on-board processing unit; and a high-bandwidth high-latency mobile data connection, or W-LAN 204. The system receives live recorded images from the on-board cameras 202, as well as coarse GPS coordinates from the on-board odometry. The localisation result 208 is handed over to autonomous driving logic. The map building result resides within a cloud-based repository 206.

In FIG. 2, the high-end on-board processing unit comprises: a first unit, Unit A, that aggregates fixed batches of input images into range limited local map representations requests and receives pre-processed extended reference map sections upfront via the mobile data connection; and a second unit, Unit B, that then matches any completed local map representation with its corresponding reference map section computes the geo-localization that is then passed back to Unit A as a match result. A third unit, Unit C, is located in the cloud and occasionally receives packets of source data, that are eventually incorporated into the reference map.

Figure 3:
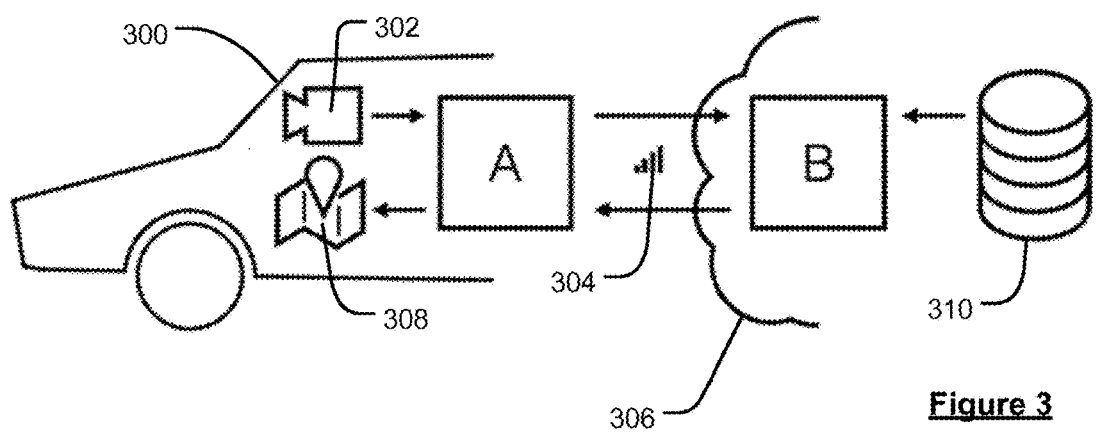
FIG. 3 shows schematically another example of V-GPS odometry support for autonomous vehicles.

Small Footprint V-GPS-Only Odometry Support in Autonomous Vehicles for Third Party Reference Maps FIG. 3 shows an autonomous vehicle system 300 equipped with a camera sensor input and a low-bandwidth mobile internet connection for communication with a third-party reference map database within a cloud-computing environment in order to determine the localisation result. Thus, the autonomous vehicle is equipped with a monocular or stereo camera 302; a low-end on-board processing unit; and a low-bandwidth low-latency mobile data connection 304. The system receives live recorded images from the on-board cameras 302, as well as coarse GPS coordinates from the on-board odometry. The localisation result 308 is handed over to autonomous driving logic.

In FIG. 3, the on-board processing unit comprises a first unit, Unit A, that aggregates fixed batches of input images into range limited local map representations and sends a completed local map via the mobile data connection 304 to a second unit, Unit B, that is located in the cloud. Unit B requests for any incoming local map representation the corresponding third party reference map section, performs matching within the cloud and sends back the geo-localization via the same mobile data connection. Unit C as shown in FIG. 2 is replaced by a third party provided reference map service (also no map update means no additional upstream bandwidth required).

Off-board V-GPS/V-GMS for Drones

Figure 4:
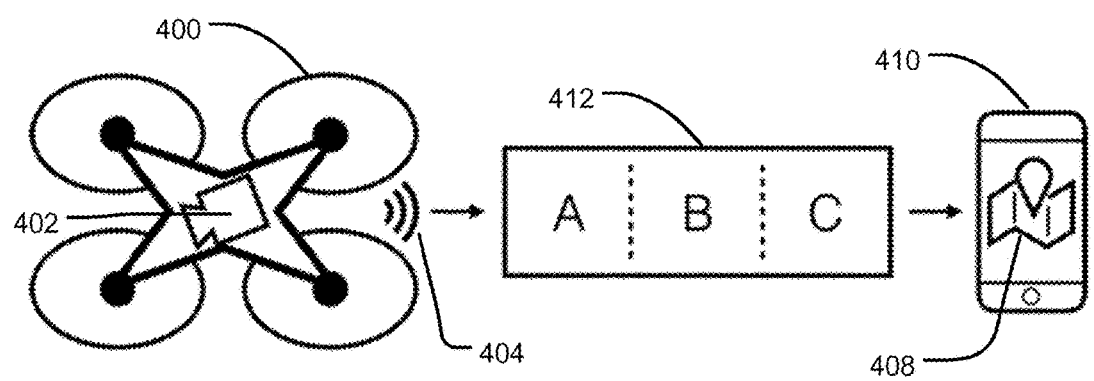
FIG. 4 shows schematically an example of an off-board V-GPS/V-GMS using drones.

FIG. 4 shows an example of a drone-based system comprising an operator-controlled drone having a camera sensor input for providing a high-bandwidth wireless video to a processing unit that in turn provides the localisation and mapping result to a drone operator device (e.g. phone or navigation unit). Thus, the system is comprised of a drone 400 with a monocular or stereo camera 402 and a low-bandwidth low-latency wireless data connection 404 for communicating with a high-end high-capacity base station processing unit 412 (there is no on-board processing unit on the drone). The V-GPS/V-GMS system thus resides on a base station. The base station wirelessly receives live recorded images from the on-board camera 402 of the drone 400. The localisation and mapping result 408 is then handed over to a mobile operator device 410.

The V-GPS/V-GMS system includes three units, which in FIG. 4 all reside on a base station 412. Unit A receives and aggregates fixed batches of input images into range limited local map representations. Unit B directly matches local map representations against locally available reference map sections. Unit C directly incorporates source data into the reference map.

Figure 5:
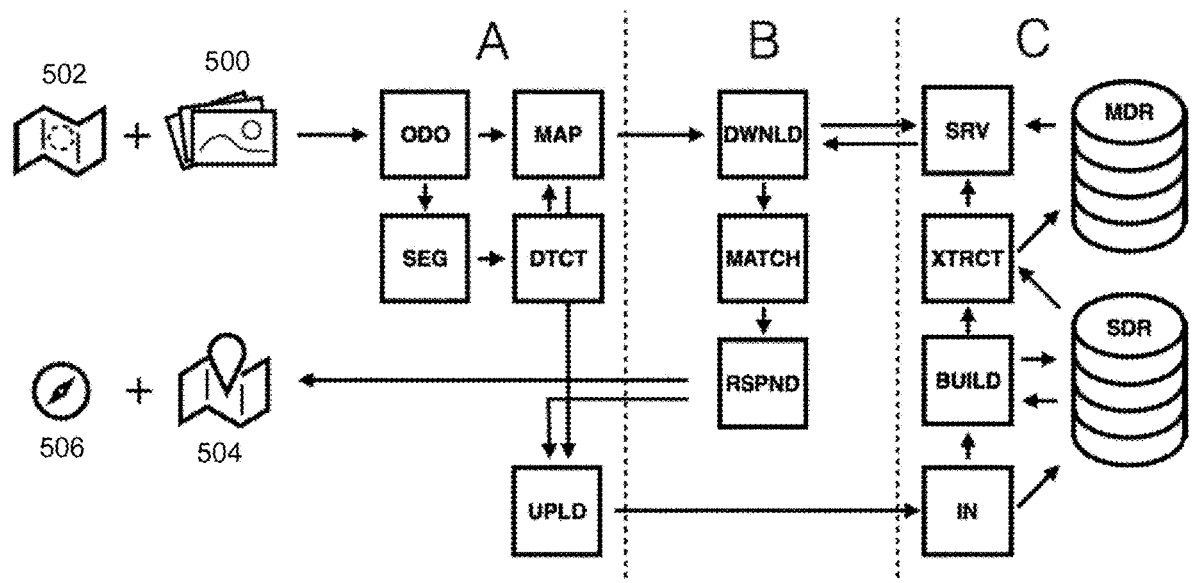
FIG. 5 shows schematically the interaction and functional units of a V-GMS/V-GPS system according to embodiments of the present invention.
Figure 6:
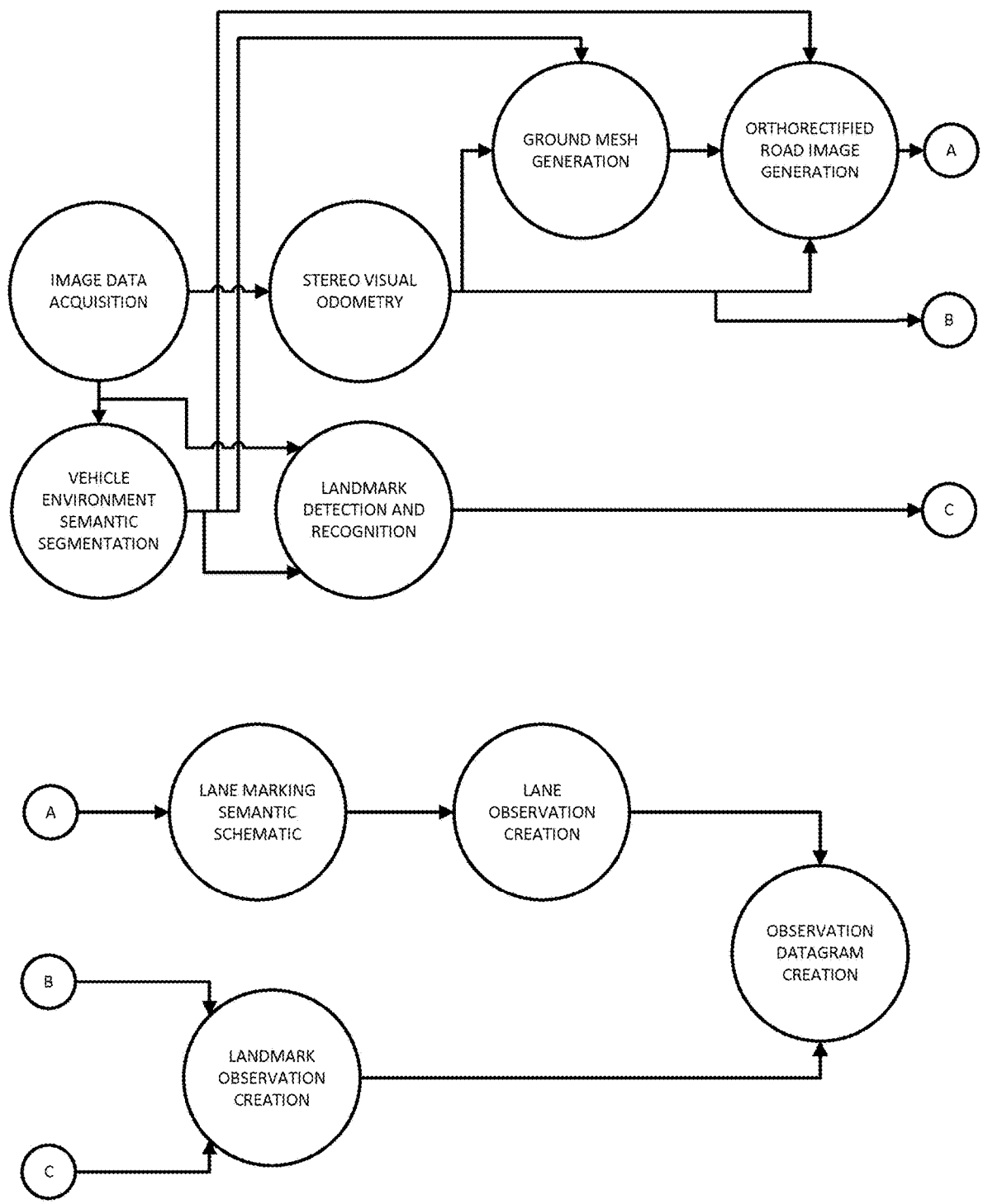
FIG. 6 shows an example of a processing flow that may be performed during the local map aggregation according to embodiments of the present invention.

FIG. 5 illustrates the interactions between the functional units or sub-systems within the system. In particular, FIG. 5 shows schematically the steps performed by each of the three units referred to above. The following sections thus provide a detailed break-down of exemplary embodiments of the system's logical components into individual processing steps and techniques, at least according to some examples. FIG. 6 shows in more detail an example of a processing flow that may be performed (in Unit A) to generate a local map representation from the recorded images. Although illustrated in FIGS. 5 and 6 as comprising a number of different modules (or steps), which receive various inputs, it will be appreciated that the various modules and steps need not be performed by separate processing circuitry, and that in embodiments at least some of these steps may be performed using shared circuitry. Furthermore, in embodiments, it will be appreciated that not all of these modules need be provided. For instance, some of the described steps may be omitted or replaced by similar or equivalent steps that provide the same basic function.

Unit A—Local Map Aggregation & Object Detection

Image Data Acquisition

The input to the system generally comprises a sequence of images 500 which are obtained from one or more camera(s) associated with a vehicle travelling through the road network. Each of the images is recorded at a known location along the road network. Optionally, the images 500 may be provided along with a (coarse) location 502, as described above. For instance, the image data may be combined with GNSS positioning data, e.g. from a navigation module of the vehicle, in order to provide an approximate location and an accurate timestamp for the obtained images. However, in some cases, the (relative) locations of the images may be determined from the images 500 themselves.

The sequence of images 500 typically comprises one or more video streams obtained from various camera sensors that are provided on or in a vehicle that is to be localised. Thus, the camera sensors obtain images of the road environment within which the vehicle is currently travelling.

In embodiments, the vehicle is provided with a stereo camera for the purposes of performing visual odometry and a separate observer camera for the purposes of sign detection, classification, tracking and segmentation, as will be described further below. Typically, in order to perform the desired visual odometry, the stereo image sensor is used to obtain greyscale images, and can be operated with a medium frame rate (e.g. 15-30 fps) and resolution (e.g. 1280×720). On the other hand, the observer image sensor is typically desired to obtain colour images, at a higher frame rate (e.g. 30-90 fps) and resolution (e.g. 2560×1440). However, it will be appreciated that various configurations and combinations of image sensors may suitably be used to obtain the images that are to be processed.

Where the sensors comprise a stereo video camera and a single (monocular) video camera, the input to the system may thus comprise a first set of video frames from the stereo camera and a second set of video frames from the single (monocular) video camera. For each of the first set of images there is also provided a depth map. Timestamps are also provided for both sets of images.

Odometry Estimation (ODO)

The system uses a visual odometry system, which estimates the relative 3D location and rotation of the camera for key frames within the video sequences. The odometry may be obtained purely visually, by applying an on-the-fly Structure from Motion approach on video data, the same way as in typical Visual-SLAM systems. For example, the odometry may be obtained as follows:
1. From a given input image sequence only those frames are picked as key frames, that show sufficient camera movement;
2. For any new key frame a plausible relative 3D pose may be initialized by tapping external odometry sources, such as a high-precision on-board odometer and differential GPS;
3. The absolute pose is then estimated and optimized globally according to associated image features along all other key frames.

Alternatively various Stereo Imagery Alignment techniques may be used, that derive relative 3D camera poses by aligning consecutive depth images.

Preferably, the camera locations and rotations for the key frames are determined using a process of stereo visual odometry. In general, any known stereo visual odometry technique may be used to determine the camera locations and rotations for the key frames. However, in preferred embodiments, a stereo direct sparse odometry (DSO) process is used to estimate the relative camera locations and rotations for each of the key frames.

Figure 7:
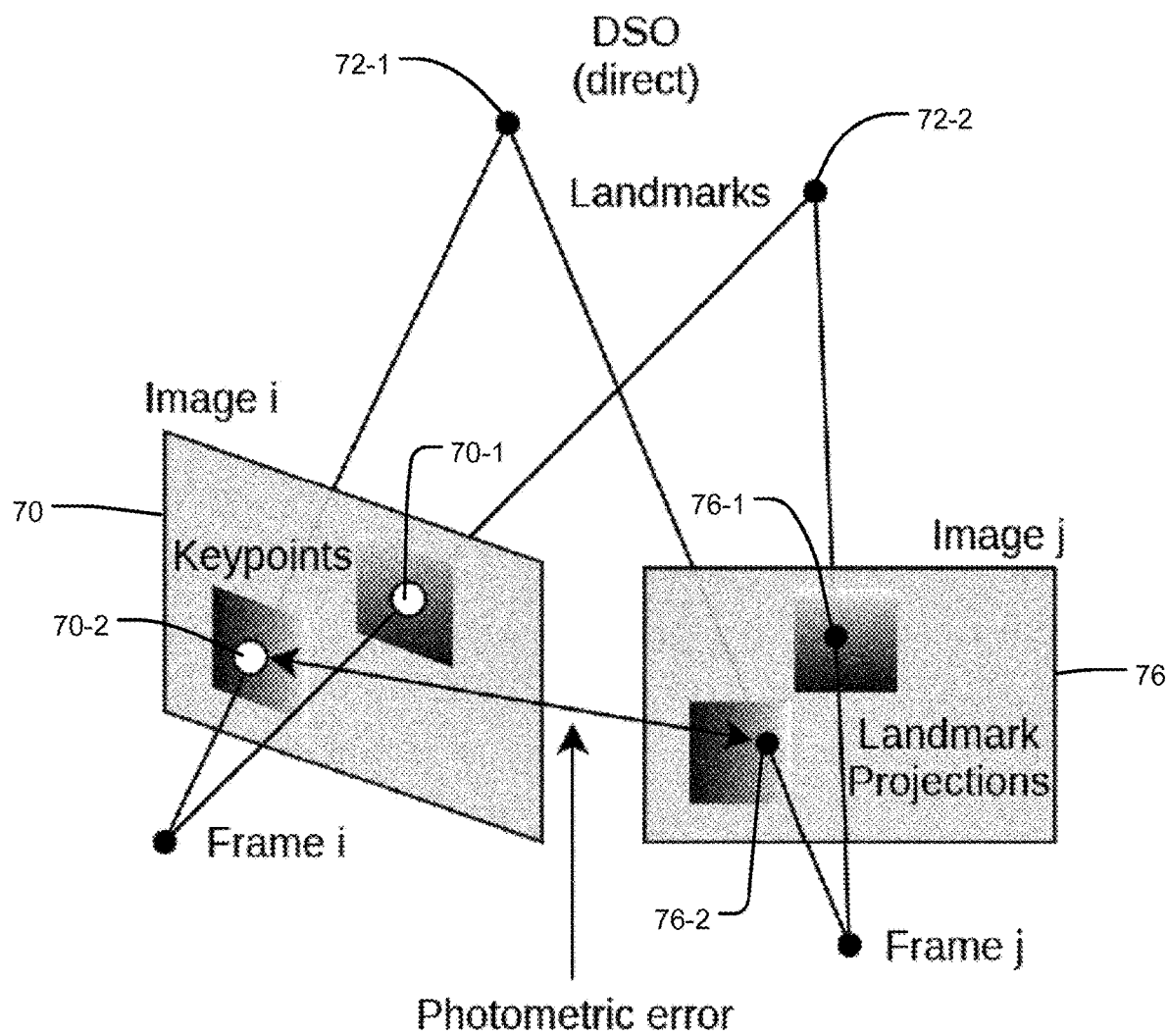
FIG. 7 illustrates the principle of a stereo direct sparse odometry (DSO) technique that may be used in embodiments, e.g. to determine the camera poses associated with the images that are being processed.

DSO is a known technique based on the direct minimisation of photometric error between projections of objects onto a camera (i.e. rather than an indirect technique such as bundle adjustment). The underlying principle behind DSO is illustrated in FIG. 7. As shown in FIG. 7, each landmark (or object) can be defined in a given frame as a set of keypoints and a depth. For instance, in FIG. 7, there are two landmarks 72-1, 72-2, and the projections of these into the reference frame image 70 (frame i) define a corresponding set of two keypoints 70-1, 70-2, each implicitly having a corresponding depth value. In order to project, or track, the landmarks from the reference frame (frame i) into an image of a subsequent frame (frame j), the keypoints are projected onto the subsequent frame and the photometric errors for the projected plurality of keypoints 76-1, 76-2 are minimised in order to determine the camera pose at the subsequent frame (frame j) relative to the reference frame, i.e. by determining the appropriate transformation for moving from the reference frame to the subsequent frame which minimises the photometric error.

Compared with indirect methods such as bundle adjustment, DSO does not require feature detectors (such as a scale-invariant feature transform (SIFT)) to determine keypoint correspondences in the two images. This means that keypoints for DSO can be located anywhere in the image, including edges.

The original DSO technique was based on monocular images. However, because the DSO process requires existing frames with existing depth values, and in DSO new frames are generated directly through the tracking, it is difficult to perform DSO using on the fly data. This problem can be overcome by using stereo images as input for the DSO algorithm, as in that case the frame depths can be obtained directly from the recorded images.

Figure 8:
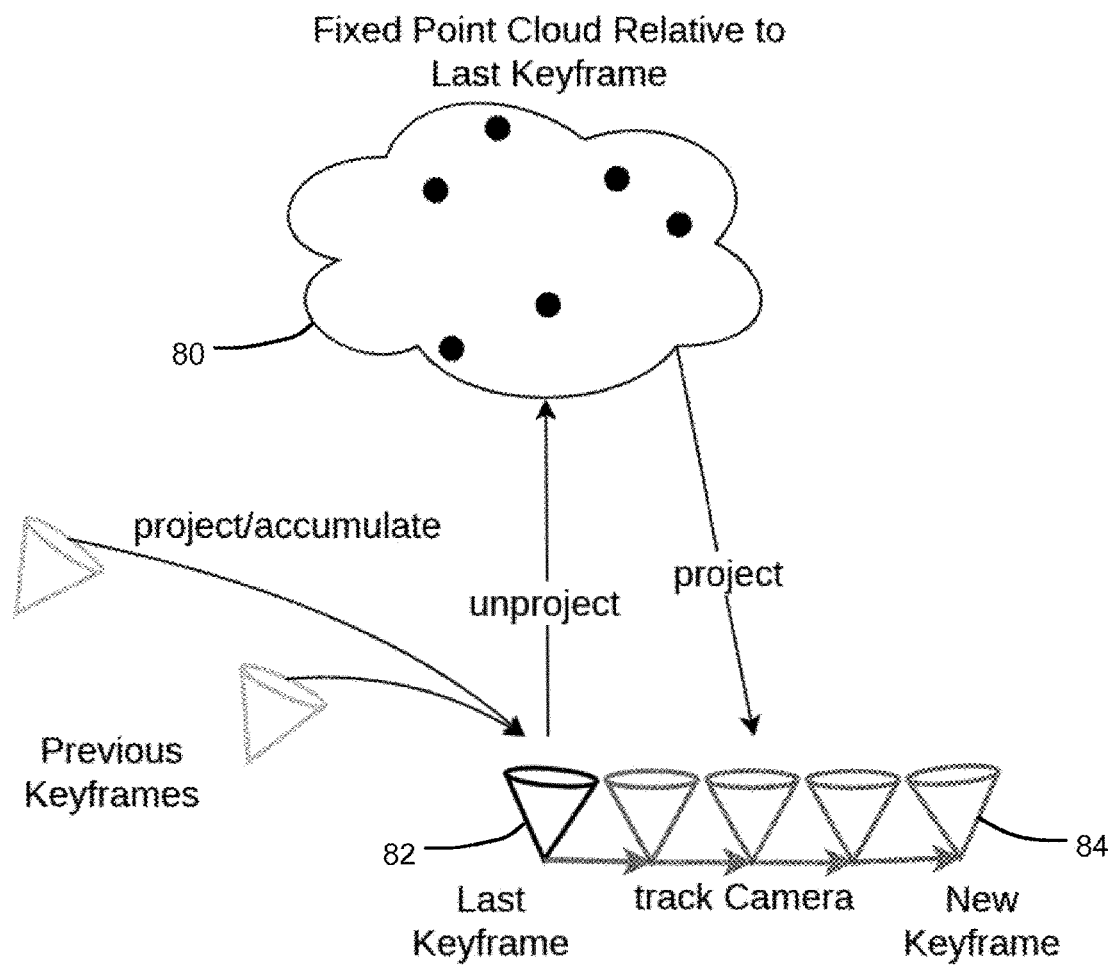
FIG. 8 shows further details of the DSO technique.

FIG. 8 shows an example of using DSO to track the camera between keyframes of the video sequence. For each keyframe 82, there is a fixed point cloud 80 representing the projections of the keypoints onto that keyframe. The camera tracker then calculates the optimal camera parameters (rotation, translation) to minimise the photometric error for all points in the depth map when projected from the keyframe into the current frame. When the tracked camera has receded from the last keyframe more than a given threshold, so that the error becomes too large, a new keyframe 84 is generated (having a new fixed point cloud).

The quality of the extracted visual odometry depends on visual properties of the image sequence. Visual artefacts, such as motion blur, image distortion, glare and reflections significantly reduce the number of image features that can be associated across the key frames. Also, inconsistent image motion, such as moving cars, mirror surfaces in windows or puddles and even weather conditions may easily interfere with the essential associability of image features and thwart any visual odometry extraction attempts. For increasing lengths of recorded image sequences, the chance for invalid odometry reconstructions also increases rapidly.

For the sake of robustness, the visual odometry extraction is therefore limited to occasional "islands of stability", where the reconstruction meets a given quality margin or reaches map size limit. Depending on sensor, vehicle and environmental conditions, reasonable sizes for these stable patches of valid reconstructed odometry range from around 50 m to 200 m. Likewise, depending on various internal and external conditions, the frequency of occurrence of these stable patches may range between 2 to 10 patches per kilometre in average urban and rural environments.

These stable odometry patches are then passed along with all key frame data to the Image Segmentation (SEG), and the Aggregated Local Map (MAP) processing step.

Where the sensors comprise a stereo video camera and a single (monocular) video camera, the input to the system may thus comprise a first set of video frames from the stereo camera and a second set of video frames from the single (monocular) video camera. For each of the first set of images there is also provided a depth map. Timestamps are also provided for both sets of images.

Thus, in embodiments, the output of the visual odometry is a pose (rotation and position) for the key frames of the first set of video frames from the stereo camera, e.g. relative to the first frame of the first set of video frames. The output may also include a key point cloud, i.e. a point cloud of key points within key frames, e.g. for use in generating a ground mesh as discussed below.

Image Segmentation (SEG)

In the Image Segmentation processing step, each pixel in every given key frame is classified according to a set of predefined environment classes, e.g. road, tree, lane marking, car and more. The class labels are then attached to each pixel and made available for subsequent processing steps, which might care about a certain subset of the environment classes, e.g. only the ground. The segmentation may be performed by one or more per-pixel classification approaches, such as:
- a previously trained advanced deep neural network-based image classification system,
- using depth data from a stereo camera to segment ground level pixels, walls/housing or poles of traffic signage,
- using sparse feature point cloud data provided by the odometry estimation that allows the formation of a coarse ground mask.

Image Segmentation is performed to classify the objects appearing in the images, e.g. so that the classified objects can be extracted, and used, by the other processing modules in the flow. Thus, a step of "vehicle environment" semantic segmentation may be performed that uses as input the obtained image data, and processes each of the images, on a pixel by pixel basis, to assign an object class vector for each pixel, the object class vector containing a score (or likelihood value) for each of a plurality of classes. Thus, for example, a pixel may be classified as having a 98% likelihood of representing a portion of sky in the image, and a 1% likelihood of representing a road sign, and/or a 1% likelihood of representing road, etc. The pixels, once classified in this way, can be grouped together into objects (e.g. by grouping together adjacent, or closely spaced, pixels having a high likelihood of representing the same object).

In general, the pixel by pixel semantic segmentation can be performed using any desired or suitable algorithm. In preferred embodiments, a machine learning algorithm is used, and particularly a convolutional neural network (CNN). For example, the algorithm may comprise, or be based on, the known SegNet or PSPNet algorithms, although of course other algorithms may suitably be used. Thus, the pixels in the image can generally be classified according to one of a number of pre-defined classes. For example, the classes may include some, or all of: sky, building, pole, road-marking, road, pavement, tree, traffic sign, fence, road vehicle (and type), person, bicycle, traffic light, wall, terrain, rider, train, etc. These classes are generally defined within the SegNet and/or PSPNet algorithms.

FIG. 9 shows an example of the result of the vehicle environment semantic segmentation process. The result of the processing is that each of the pixels within the original RGB image (left hand panel) is allocated an object class, and each of the different object classes can then be represented in a consistent manner in the semantically segmented output (right hand panel). Thus, all of the objects within each class may be extracted and used for subsequent processing steps.

These object classes may then be passed along with the camera poses obtained using the visual odometry (ODO) and the (key) frames to the High Level Feature Detection (DTCT) processing step.

High Level Feature Detection (DTCT-1)

The High Level Feature Detection step, identifies and tracks high-level features such as traffic signs/lights, lane markers, trees, etc. across given frames. Using the known odometry of the camera the tracked high-level features can also be triangulated into the 3D space relative to the camera positions. These feature positions and their class labels are made available for subsequent processing steps, along with their pixel representations in the input image sequence. The High Level Feature Detection makes use of the previously computed image classification to limit specialized feature detection efforts to the appropriate regions. The feature detection may be performed by one or more per-patch classification approaches, such as: brute-force convolution response clustering, using GPU processing capabilities; fast object detection using feature cascades, e.g. the Viola-Jones approach for object detection; a previously trained random forest classifier suitable for multiple classes, etc.

For instance, the High Level Feature Detection may comprise various steps for creating landmark observations, e.g. as set out below.

Landmark Detection and Recognition

Landmarks may be detected from the classified image by extracting any pixels, or groups of pixels that have been allocated an object class corresponding to a landmark, such as a "traffic sign" object class, and so on. For instance, using the observer image frames output from the image data acquisition, as well as the pixel class score vectors from the vehicle environment semantic segmentation, it is possible to generate a number of bounding boxes in the form of a list of one or more areas (typically rectangles) in each frame, if any, that contain a detected landmark. These bounding boxes may then be output along with the landmark class. The landmarks may be detected solely on the basis of the original vehicle environment semantic segmentation. However, in embodiments, regions of interest in the images, i.e. regions that have been determined to potentially contain a landmark, are taken from the semantic segmentation, and a supervised learning method, such as a support vector machine (SVM) or neural network, is used on the regions to assign a class to each of the detected landmarks. That is, a further landmark class semantic segmentation (or "landmark recognition") may be performed on any regions of interest within the images as may be determined from the vehicle environment semantic segmentation processing step in order to assign a specific landmark class to each of the detected landmarks. This may improve the accuracy of the assignment of the landmark classes.

Odometry Transfer (not Shown)

An odometry transfer may be used when using different image sensors (e.g. multiple cameras) for visual odometry and landmark detection. For example, an odometry transfer may be used to calibrate the images obtained from the different cameras. In particular, an odometry transfer may be used to determine the poses of the images used for the landmark detection, e.g. the second set of video frames from the single (monocular) video camera. This may be done using the images in combination with the results of the visual odometry by suitably calibrating the images based on the rotations and/or translations needed to align the different cameras. Thus, the camera poses for the second set of images may be obtained by suitably calibrating the camera poses determined for the first set of images, e.g. in the visual odometry processing step.

Landmark Observation Creation

Landmark observation creation may be performed using the image data output from the image data acquisition module, e.g. in combination with the poses of these frames (from the odometry transfer), if required, and with the bounding boxes and landmark classes determined from the landmark detection and recognition process. For each landmark that is extracted from the image data, a landmark shape, in the form of a 2D polyline in normalized coordinates, and orientation (e.g. a pose matrix for transforming the 2D polyline into 3D space) is generated along with a landmark image describing the content of the landmark. The landmarks may comprise, e.g. traffic signs, traffic lights, billboards, etc., or any other distinguishing objects that may be present along the roadway that can suitably and desirably be used for localisation purposes.

FIGS. 10 to 15 illustrate a method for detecting, tracking and tracing landmarks, such as traffic signs, within the images. For instance, as shown in FIG. 10, the external sign detection system generally provides a single sign detection 1001 for each frame 1002 of a given set of frames. However, as illustrated, these detections may be sporadic (for instance, the third frame does not include any sign detection), or prone to false negative/positive detections (as in the fourth frame), as well as providing imprecise boundaries.

Thus, in embodiments, each detected sign is then carefully tracked with respect to its perspective distortion and within a range of adjacent frames in the frame sequence (backwards and forwards). The tracking result is comprised of a set of perspective transformations 1101 that describe the ideal mapping of the detected sign, i.e. the pixel cut-out, in the original frame in which the sign was detected (the origin frame) to the range of adjacent frames. This is illustrated in FIG. 11A. As shown in FIG. 11B, this in turn allows the sign to be triangulated to give a representation 1102 of the sign in the 3D coordinate system of the vehicle (i.e. the coordinate system of the vehicle's odometry, as may be determined above).

Figure 12:

This is done for every detected sign and every single detection in all given frames. Thus, this results in many triangulated contours 1201 for the same physical sign that should roughly overlap if the tracking quality is sufficiently high. This is shown in FIG. 12.

Figure 13:
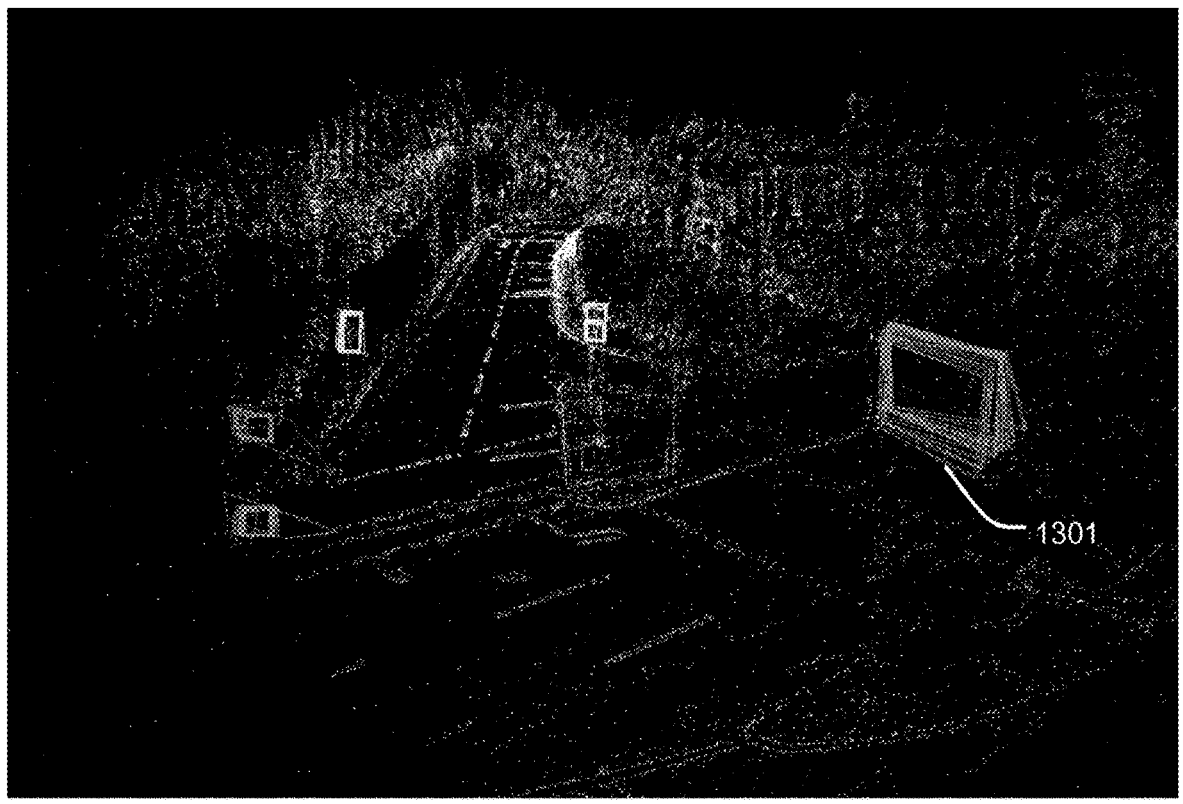

The 3D representations are then grouped and fused together, with outliers removed. The 3D grouping thus provides an accurate false positive filter, as false positives, or otherwise inaccurate sign detections and triangulations, would tend to appear scattered in 3D space, whereas true signs will pile up nicely (see e.g. the detection with reference sign 1301), as shown in FIG. 13.

Figure 14:
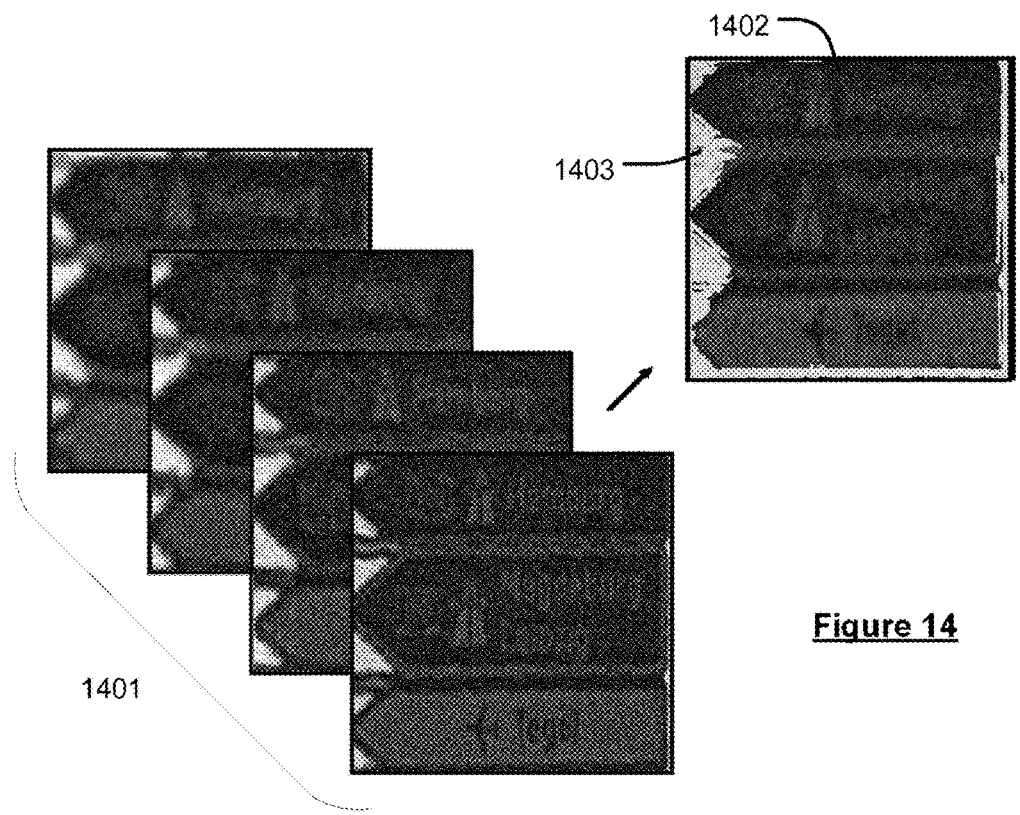

The fused sign contours also allow the sign to be located in the 2D image space and cut-out accurately from each frame to give a number of cut-outs 1401 of the sign. By overlaying all of the cut-outs, a fused image of the sign 1402 can be created. This can be used to reliably remove defects like occlusions or specular highlights from the sign's image, and also to detect the sign's boundaries, e.g. by masking pixels 1403 that have high colour variance among the cut-outs. This is illustrated in FIG. 14.

Figure 15:
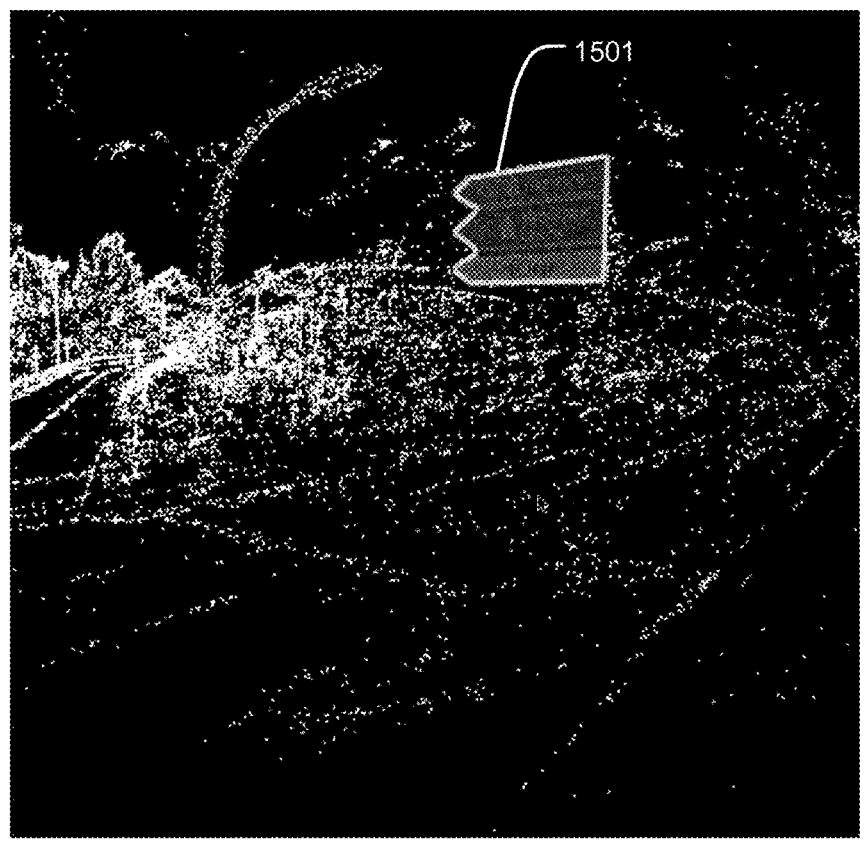

The pixel contours of the masked cut-out may be vectorised to provide an accurate 3D reconstruction 1501 of the sign's shape, pixel content and position with respect to the vehicle's odometry, e.g. as shown in FIG. 15. This accurate reconstruction may be used for various follow up applications, such as visual global positioning of the type described herein, i.e. by associating the 3D sign reconstructions derived from a recording session with reference 3D signs in a map; or for refining monocular visual odometry and SLAM recording by allowing inaccuracies such as scale drift to be corrected by exploiting knowledge about real world sign sizes and using this information to normalise scale, e.g. in monocular structure from motion reconstructions.

Local Map Aggregation (MAP-1)

This processing step aggregates a local map by creating a 2D top-view dense orthophoto reconstruction and embedding all previously extracted high-level features (e.g. landmarks and/or lane marking) into it.

For the dense orthophoto reconstruction, first a gap-less ground geometry is estimated using the points extracted from the sparse feature point cloud. Depending on the accuracy requirements, the ground model may be comprised of:
- a single plane over all 3D feature points that have been classified as ground,
- the intersection of multiple ground planes in the vicinity of each key frame, or
- a coarse polygon mesh spanning over ground feature point clusters.

Using the known absolute positions and orientations of each key frame and its associated virtual camera (provided by the visual odometry estimation), all 2D image information, i.e. pixel colour, segmentation information along with the high-level feature positions, is projected onto the 3D ground geometry. A 2D orthophoto of this patch is then generated by projecting the data again on a virtual orthographic camera which looks perpendicularly down at the ground, thus yielding a bird's eye view of the scenery. Overlapping data is combined with respect to the projection error range, depending on camera position estimation accuracy, viewing angle, distance, etc.

Ground Mesh Generation

Figure 17A:
FIGS. 17A, 17B and 17C show, respectively, a tongue ground mesh, a raster ground mesh and a tongue and raster ground mesh superposition.
Figure 17B:
Figure 17C:

A "ground mesh" may be generated including any ground-level features within the road network. The DSO point clouds output from the stereo visual odometry process described above, or a stereo point cloud determined directly from the depth data for the stereo images, may be used, optionally along with the relevant pixel class score vectors output from the semantic segmentation process in order to generate a ground mesh. For instance, the object classes obtained from the semantic segmentation may be used to select any ground features, such as "roads" or "lane markings", etc. However, the semantic segmentation may not be perfect, and in some cases the semantic segmentation may give some false values, i.e. selecting some points as ground-level points even when they are not on the ground. For instance, the depths for the keypoints within DSO point cloud may be used to further select ground-level points. In some cases, e.g. where the DSO point cloud is too sparse, a stereo point cloud may be used instead (e.g. obtained directly from the first set of images and the associated depth maps). In embodiments, various combinations of the DSO and stereo point clouds may be used. For instance, the stereo point cloud may be used to interpolate for regions wherein the DSO point cloud is too sparse. In embodiments, the point cloud, e.g. either the stereo point cloud or the DSO point cloud, can be filtered, for example, by using one or more of: a normal filter (to remove points indicative of cars, trees and buildings that were incorrectly classified by the semantic segmentation); a statistical outlier removal filter; and a RANSAC filter, and the mesh is created using the filtered point cloud. The ground mesh may generally comprise either a grid-style and/or tongue-style ground mesh, e.g. as shown in FIGS. 17A-17C.

Orthorectified Road Image Generation

The ground mesh may in turn be used along with the images from the camera and associated poses to generate an orthorectified image of the road. For example, a bird's eye mosaic georeferenced image of the road may be generated containing a 2D top view of the trip in which the images are projected onto the ground mesh and blended/weighted together, such that the pixel value of each pixel in the image represents the colour of the location in environment detected from the images used to generate the image.

Figure 16:
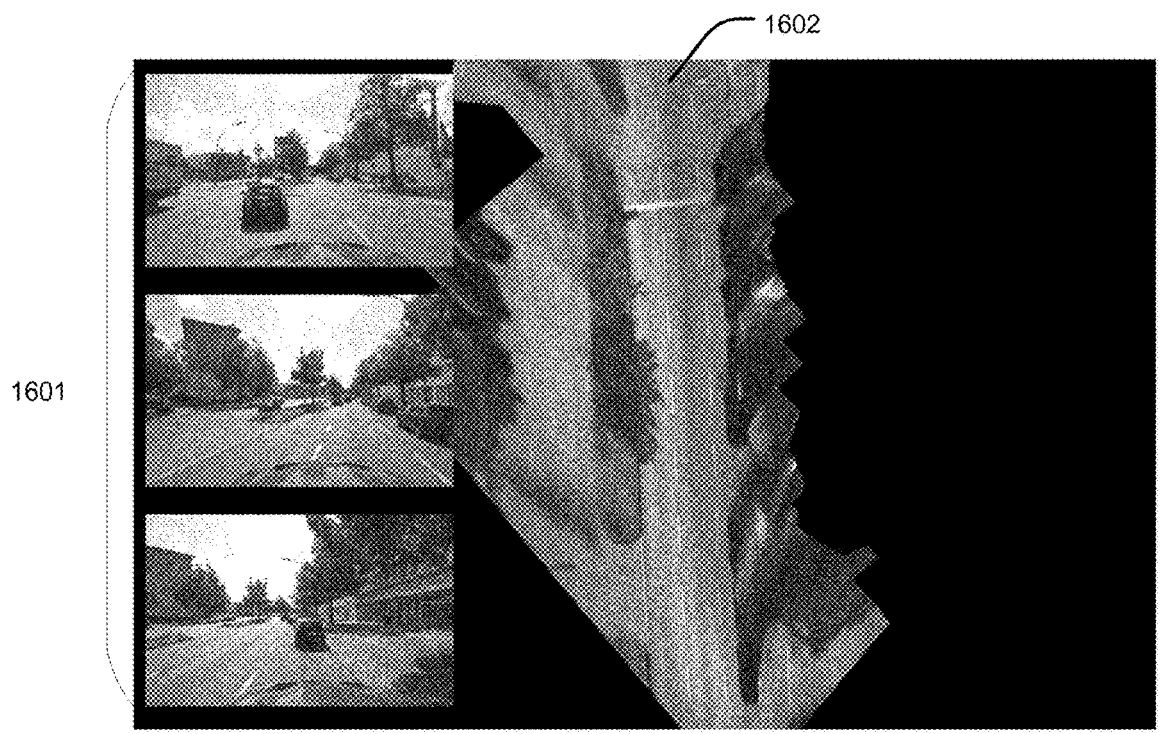
FIG. 16 shows how the (2D) images can be projected onto the ground in order to generate a view of the road geometry from a different (top-down) perspective.

FIG. 16 shows how a plurality of 2D images 1601 can be projected onto the ground and how these projections can then be combined in order to provide an image 1602 of the road. For instance, once the camera poses are obtained using visual odometry, it is then possible to re-project the image from any desired perspective. As shown in FIG. 16, a plurality of images are projected onto the same map area, and then blended together, with appropriate weighting, in order to build up an image of the road in that area. This can be repeated using all of the recorded images for which the camera poses are known in order to generate an accurate orthorectified image of the road.

If used in the lane marking semantic segmentation, a linearly registered image (LRI) may also be generated including a georeferenced image containing a straightened view of the trip as determined from the bird's eye mosaic. Further details of LRI generation can be found, for example, in WO 2009/045096 A1 and WO 2017/021473 A1.

The resultant bird's eye mosaic or linearly registered image may be used as the local map in embodiments of the invention.

High Level Feature Detection (DTCT-2)

The High Level Feature Detection may additionally comprise various steps for creating lane marking observations, e.g. as set out below.

Lane Marking Semantic Segmentation

Figure 18A:
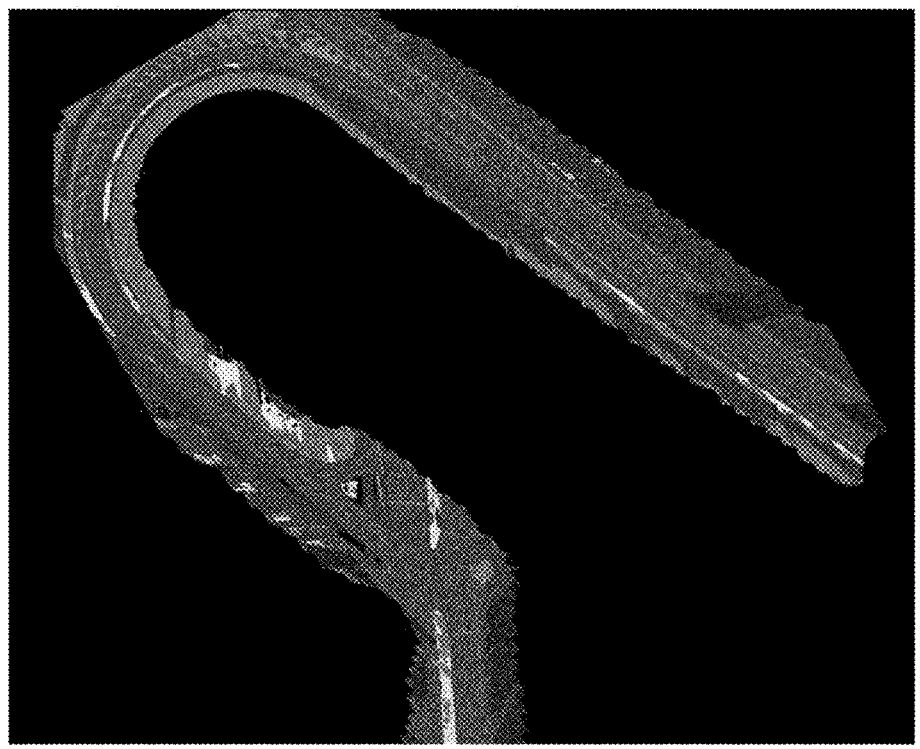
FIG. 18A shows how a road image can be generated wherein the pixel values are set based on a semantic segmentation to better highlight the lane marking objects.
Figure 18B:
FIG. 18B shows how a road image can be generated wherein the pixel values are set based on a semantic segmentation to better highlight the lane marking objects.

In addition to, or alternatively to, the bird's eye mosaic and/or linearly registered image described above, an orthorectified road image can also be generated in which the pixel value of each pixel in the image represents the probability of the location in the environment being a lane marking object, as output from the vehicle environment semantic segmentation. For example, when using a greyscale colour space, any pixels that have been allocated a 100% probability of being a lane marking object may be 'white', while any pixels with a 0% probability may be 'black', with the other pixel values being selected appropriately based on the respective probabilities. In this way, a "filtered" greyscale orthographic road image can be generated that highlights the lane marking objects, and which offers a clearer image on which to perform lane marking semantic segmentation. Such an filtered image is shown in FIG. 18B. For comparison, FIG. 18A is determined from the same initial images, but wherein the pixel value indicates the most likely object class for the location as determined from the initial semantic segmentation. As can be observed, the lane markings are significantly clearer in FIG. 18B compared to FIG. 18A. This image thus represents a cleaned up road image wherein the lane marking objects are highlighted.

Lane Observation Creation

The filtered greyscale orthographic road image, typically in the form of an linearly registered image, is then subjected to a further lane marking objection detection and recognition, e.g. using a trained convolutional neutral net, to identify and classify objects in the image as specific types of lane markings. Examples of lane marking classes can include one or more of: single solid lines, single short dashed lines, single long dashed lines, double solid lines, double dashed lines, island borders, etc. Using the LRI, the lane marking objects and classes from the lane marking semantic segmentation, it is possible to generate the lane geometry, i.e. showing the lane identifiers and geometry, e.g. for use by the autonomous driving module and/or for incorporation into a HD map.

Figure 19:
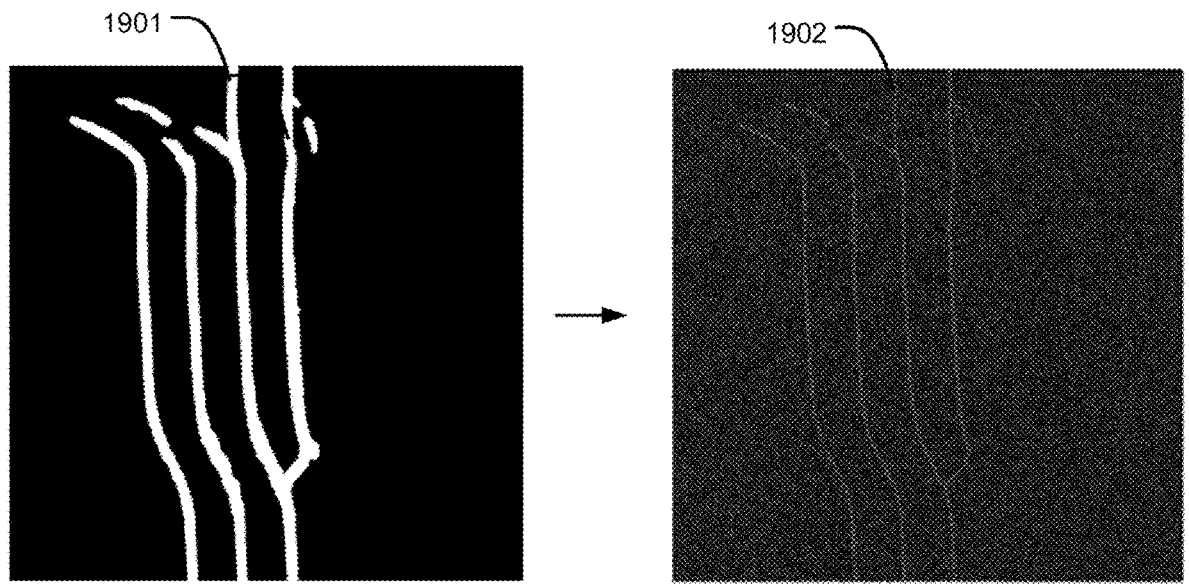
FIGS. 19 and 20 show how identified lane marker objects may be processed according to some examples of the present invention.
Figure 20:
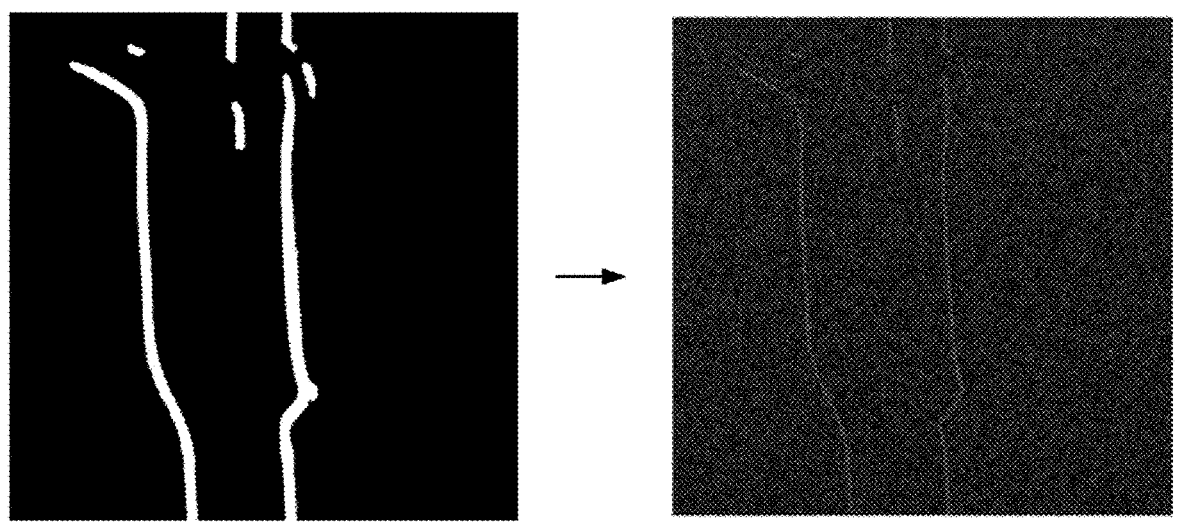

For instance, in FIG. 19, any objects identified as lane markings 1901 from the lane marking semantic segmentation, have been extracted. The identified lane markings may then be cleaned up, e.g. by thresholding and binarising the images and/or applying one or more morphological algorithms to help remove noise and smooth the data. Next, the results are skeletonized, e.g. by creating lines at the centers of each of the identified and filtered lane markings. The result of this is shown in the right hand panel of FIG. 19 which includes a number of skeletonized lane markings 1902. The algorithm then loops over each divider type and performs steps of filtering the lines for each divider type, and classifying each divider type with a different ID. For instance, FIG. 20 shows the processing on one specific divider type that has been identified based on the lane marking semantic segmentation.

Figure 21:
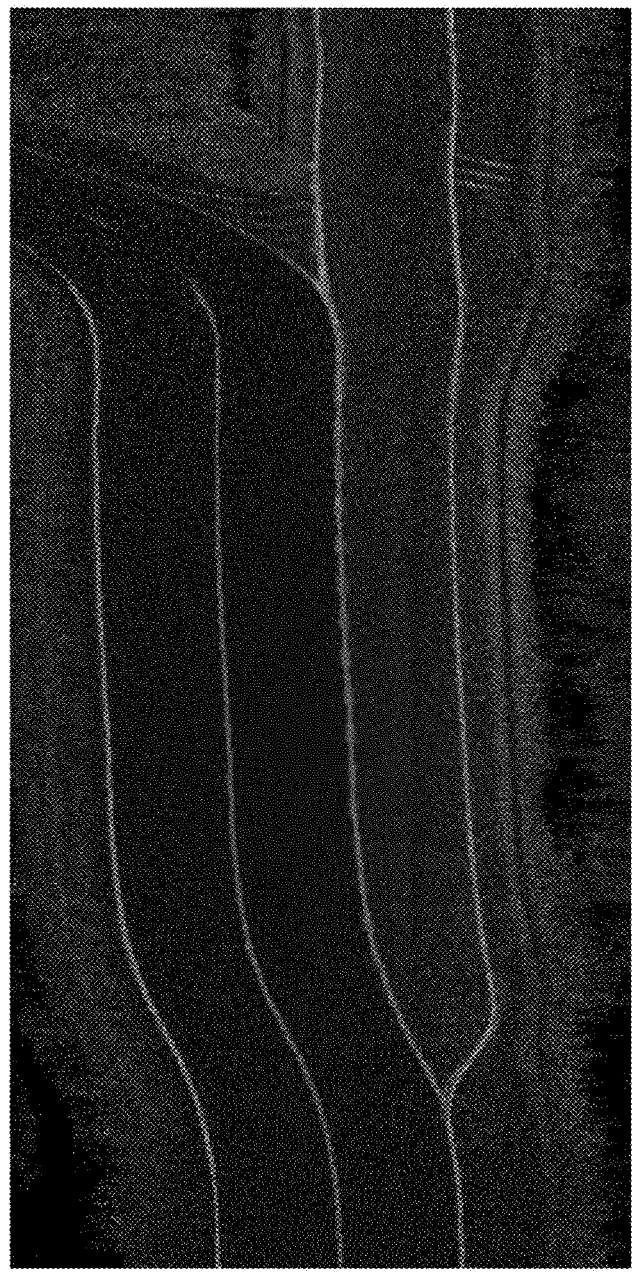
FIG. 21 shows how lane geometry for an area of the road network may be created.

FIG. 21 then shows the final result, with each different divider type being represented differently on the road image.

Local Map Aggregation (MAP-2)

As discussed above, the bird's eye mosaic or linearly registered image depicting the road network may be used as the local map, optionally with the extracted high-level features (e.g. landmarks and/or land markings) embedded into it. Alternatively, however, the local map could simply comprise the extracted high-level features, e.g. as described below.

Observation Datagram Creation

The landmark shapes, orientations and images output from the landmark observation creation and the lane geometry can thus be output to an observation datagram creation module for generating "datagrams" (or "roadagrams") that comprise localised map data, such as the lane and/or landmark observations described above, that has been extracted from the camera sensors, and that can be used e.g. for a localisation process and/or to update the HD map to more accurately reflect reality. In other words, the datagram corresponds to the local map. The datagram is generally a compressed snippet of such map data that can be sent (e.g. to the cloud) with minimal bandwidth to allow for scalable and efficient updates to the HD map.

The datagrams may thus comprise the landmark observation creation data and/or the lane observation creation data output from the previous steps. Typically, the datagram will include both landmark and lane marking observations. However, in some cases, there may be only landmark observation or only lane observation data in which case only one of these (i.e. the one for which there is available data) is used to generate datagrams, e.g. and update the map. This may be the case, for instance, for rural road sections wherein there are no useful landmarks, or wherein there are no lane markings, or wherein for some reason data is not obtained (e.g. the vehicle only has some of the available sensors).

The general processing flow for generating these datagrams is shown in FIG. 6. Thus, the flow in FIG. 6 starts with a step of image acquisition. The recorded images are then provided to vehicle environment semantic segmentation and stereo visual odometry modules for performing the vehicle environment semantic segmentation and visual odometry described above. The recorded images and the results of the vehicle environment semantic segmentation may then be used to detect and recognise landmarks. For each detected landmark, a landmark observation may then be created using the landmark detection and the camera poses obtained from the visual odometry. In parallel to this, the results of the vehicle environment semantic segmentation and the camera poses and point clouds obtained using the visual odometry may be used to generate a ground mesh. The ground mesh may in turn be used to generate an orthorectified road image upon which a further step of lane marking semantic segmentation may be performed from which lane marking observations may be created. The landmark and lane marking observations may then be used to create a "datagram" for incorporation into, or for use as, the local map representation. An example of the general processing flow, i.e. of Unit A of FIG. 5, is also depicted in FIG. 22.

Map Source Data Upload (UPLD)

A successfully matched local map contains valuable data that can contribute to the creation and/or the maintenance & updating process of a global-scale reference map.

Selected source data, such as key frames, classification masks & detected high-level features, is bundled as a map creation & map update package and scheduled for transfer to the map creation process. The supplied data may be selected according to map creation and updating needs, i.e. for the purpose of filling unmapped or out-dated areas of the global-scale reference map.

Unit B—Global Map Lookup & Pose Estimation

Global Map Section Retrieval (DWNLD)

The Map Section Retrieval step requests and retrieves the sub-section of the global-scale reference map which corresponds to the approximate location and the extents of the aggregated local map, which is being matched against.

The selected section may be derived from multiple coarse positioning sources, such as: a given coarse GPS position and compass based orientation in conjunction with a low precision odometer, which should be roughly in line with the extents of the reconstructed local map.

The information layers retrieved for matching shall match the information present in the local map and may be:
- long-term associable high-level features, preferably those that have been spotted in the local map as well,
- well-selected associable low-level features, selected by daytime, season, and viewing directions according to the local map's input images,
- a synthetic orthophoto map section, created with a compatible configuration.

Localization & Matching (MATCH)

The localization step is performed by matching the local map with the reference map section. The localization quality and robustness is achieved by exploiting the durability and stability of the local map-embedded or extracted high-level features. Applicable techniques may be:
- associating corresponding high-level features & objects within the local map and the reference map, and deriving the map's transformation that best aligns the corresponding features (e.g. as in RANSAC)
- transforming the local map's dense 2D orthophoto reconstruction onto the corresponding reference map's orthophoto, such that differences in pixel intensities are minimized (as in Image Error Regression approaches such as KLT)
- 3D matching and aligning selected key frames from the local patch and from the map, by optimizing the key frame's pose according to low-level feature correspondences (as in Structure from Motion's bundle adjustment).

The result is a globally referenced location and orientation of the uploaded patch in the global map with high accuracy and precision.

Location Response (RSPND)

The Global Map Lookup & Pose Estimation Unit responds with the global location 504 and orientation (pose) 506 along with extra information regarding the pose estimation, such as: confidence & precision, overall patch-wide & local quality, and/or map coverage & up-to-dateness.

This extra information may be used by the Local Map Aggregation & Object Detection Unit component to: more accurately incorporate the pose result into externally provided positioning data and decide whether any data should be provided to the Global Map Creation & Update Unit for map building purposes.

Unit C—Global Map Creation & Update

Source Data Input (IN)

The source data input step receives source data for map building and updating purposes. The data packages are stored in a world-scale source data repository for and made available for subsequent map processing.

The Source Data Input step also notifies map building and adjustment services about the availability of incoming and unprocessed jobs.

Map Building & Adjustment (BUILD)

The map building and adjustment step receives and aggregates regional update notifications about changes and newly available data in the world-scale source data repository.

As part of an on-going building and optimization process, the map building and adjustment process iterates over every updated region and:
1. retrieves all source data (including newly added data) for the updated global map section
2. incorporates new data with existing source data and updates the odometry reconstruction for the whole section
3. stores the updated section back into the world-scale data repository
4. notifies the Reference Map Extraction step about updated map sections.

The reconstruction and adjustment of a section wide map is done by applying structure from motion techniques to a selected quality subset of the source data. Long-term associable features, such as detected high-level features, selected low-level features along with geo-registered points are associated and bundle adjustment is applied repeatedly. Additionally third party data containing associable high-level features may also be included to further improve map building stability and accuracy.

An example of the map building and adjustment step, i.e. of Unit C of FIG. 5, is depicted in FIG. 23.

Reference Map Extraction (XTRCT)

The Reference Map Extraction pre-produces map matching data from the world-scale source data repository (SDR). This map matching data is intended to be compatible with the Localization & Matching step's purpose of matching and aligning a given aggregated local map. Therefore it may be comprised of the same information layers as the aggregated local map that is compiled by the Local Map Aggregation & Object Detection unit.

Similar to the Map Building & Adjustment Step, the Reference Map Extraction Step is part of an on-going production service. It iterates over every updated source data section and:
1. retrieves newly built and/or adjusted source data;
2. extracts condensed & space optimized matching hints/information (appropriate for Localization & Matching step) these matching information layers may additionally contain:

optional high-level feature data for improved association (i.e. OCR)

filtered & quality enhanced synthetic 2D top-view dense orthophoto reconstruction (i.e. for KLT-based fitting)

selected categorized low-level feature extraction (i.e. by daytime, season, weather conditions, etc.);

3. stores extracted patch matching data in world-scale match data repository (MDR);
4. notifies the Reference Map Information Service about occurred changes.

Reference Map Information Service (SRV)

The Reference Map Information Service provides efficient and scalable access to the reference maps that is incrementally generated and provided by the Reference Map Extraction step. For requested map sections, the service:

retrieves and compiles reference map data from world-scale map data repository responds with a condensed/compressed reference map data bundle.

The Reference Map Information Service may or may not include caching techniques.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. Thus, the features disclosed in this specification, the figures and/or the claims may be material for the realization of various embodiments, taken in isolation or in various combinations thereof. Furthermore, although the present invention has been described with reference to various embodiments, it will be understood by those skilled in the art that various changes in form and detail may be made without departing from the scope of the invention as set forth in the accompanying claims.

What is claimed is:

1. A method, comprising:

obtaining, from at least one camera associated with a vehicle traveling on a road, a sequence of images of an environment of the road, each image being associated with a location where that image was obtained;

generating a local map representation of an area of the road using at least some images from the sequence of images and the locations associated therewith, the generating including:

processing the at least some of the images to detect an object in the environment of the road, the processing including, for each image of the at least some of the images:

performing a pixel wise segmentation on the image, the pixel wise segmentation resulting in each pixel being allocated an object class or object class vector indicating a probability of each object class for that pixel; and processing the image to detect the object based at least in part on the object classes or object class vectors;

determining at least one transformation for mapping the object between the at least some of the images, the determining including determining a change in position and/or rotation for the object between sequential images based on a respective location of the at least one camera where each of the images was captured; and based on the at least one transformation and the locations associated with the at least some of the images, generating a two- and/or three-dimensional representation for the object relative to the area of the road;

comparing the local map representation with some or all of a reference map to identify a corresponding section of the reference map; and selectively updating the corresponding section of the reference map based on the local map representation.

2. The method of claim 1, wherein the object represents an object in the environment of the road network and corresponds to an object class of building, traffic sign, traffic light, billboard, or lane marking.

3. The method of claim 1, wherein the segmentation of the image is performed using a machine learning algorithm.

4. The method of claim 1, wherein comparing the local map representation with some or all of the reference map includes:

comparing the two- and/or three-dimensional representation for the object to at least one reference landmark shape in the reference map.

5. The method of claim 1, wherein generating the local map representation includes:

adding, to the local map representation, observation information including a description of at least one characteristic of the object.

6. The method of claim 1, wherein selectively updating the corresponding section of the reference map using the local map representation includes:

determining, based on the local map representation, whether the corresponding section of the reference map is missing information about the object and/or includes erroneous information for the object; and when the reference map is missing information or includes erroneous information, updating the corresponding section of the reference map based on the local map representation; and when the reference map is not missing information and does not include erroneous information, leaving the reference map unchanged.

7. The method of claim 1, wherein selectively updating the corresponding section of the reference map based on the local map representation includes:

adding, to the reference map, observation information that describes at least one characteristic of the object.

8. The method of claim 7, wherein the at least one characteristic of the object includes at least one of:

a location of the object;

an orientation of the object;

a two-dimensional (2D) polyline representing a shape of the object;

a pose matrix for transforming the 2D polyline into a three dimensional coordinate space; and a reference image describing content contained in the 2D polyline.

9. A device, comprising:

at least one processor configured to:

obtain, from at least one camera associated with a vehicle traveling on a road, a sequence of images of an environment of the road, each image being associated with a location where that image was obtained;

generate a local map representation of an area of the road using at least some images from the sequence of images and the locations associated therewith, the generating including:
  processing the at least some of the images to detect an object in the environment of the road, the processing including, for each image of the at least some of the images:
    performing a pixel wise segmentation on the image, the pixel wise segmentation resulting in each pixel being allocated an object class or object class vector indicating a probability of each object class for that pixel; and
    processing the image to detect the object based at least in part on the object classes or object class vectors;
  determining at least one transformation for mapping the object between the at least some of the images, the determining including determining a change in position and/or rotation for the object between sequential images based on a respective location of the at least one camera where each of the images was captured; and
  based on the at least one transformation and the locations associated with the at least some of the images, generating a two- and/or three-dimensional representation for the object relative to the area of the road;
compare the local map representation with some or all of a reference map to identify a corresponding section of the reference map; and
selectively update the corresponding section of the reference map based on the local map representation.

10. The device of claim 9, wherein the object represents an object in the environment of the road network and corresponds to an object class of building, traffic sign, traffic light, billboard, or lane marking.

11. The device of claim 9, wherein, when comparing the local map representation with some or all of the reference map, the at least one processor is further configured to:
  compare the two- and/or three-dimensional representation for the object to at least one reference landmark shape in the reference map.

12. The device of claim 9, wherein, when generating the local map representation, the at least one processor is further configured to:
  add, to the local map representation, observation information including a description of at least one characteristic of the object.

13. The device of claim 9, wherein, when selectively updating the corresponding section of the reference map using the local map representation, the at least one processor is further configured to:
  determine, based on the local map representation, whether the corresponding section of the reference map is missing information about the object and/or includes erroneous information for the object; and
  when the reference map is missing information or includes erroneous information, update the corresponding section of the reference map based on the local map representation; and
  when the reference map is not missing information and does not include erroneous information, leave the reference map unchanged.

14. The device of claim 9, wherein, when selectively updating the corresponding section of the reference map based on the local map representation, the at least one processor is further configured to:
  add, to the reference map, observation information that describes at least one characteristic of the object.

15. The device of claim 14, wherein the at least one characteristic of the object includes at least one of:
  a location of the object;
  an orientation of the object;
  a two-dimensional (2D) polyline representing a shape of the object;
  a pose matrix for transforming the 2D polyline into a three dimensional coordinate space; and
  a reference image describing content contained in the 2D polyline.

16. A non-transitory computer-readable storage medium storing instructions which, when executed by at least one processor of a device, cause the at least one processor to perform a method, the method comprising:
  obtaining, from at least one camera associated with a vehicle traveling on a road, a sequence of images of an environment of the road, each image being associated with a location where that image was obtained;
  generating a local map representation of an area of the road using at least some images from the sequence of images and the locations associated therewith, the generating including:
    processing the at least some of the images to detect an object in the environment of the road, the processing including, for each image of the at least some of the images:
      performing a pixel wise segmentation on the image, the pixel wise segmentation resulting in each pixel being allocated an object class or object class vector indicating a probability of each object class for that pixel; and
      processing the image to detect the object based at least in part on the object classes or object class vectors;
    determining at least one transformation for mapping the object between the at least some of the images, the determining including determining a change in position and/or rotation for the object between sequential images based on a respective location of the at least one camera where each of the images was captured; and
    based on the at least one transformation and the locations associated with the at least some of the images, generating a two- and/or three-dimensional representation for the object relative to the area of the road;
  comparing the local map representation with some or all of a reference map to identify a corresponding section of the reference map; and
  selectively updating the corresponding section of the reference map based on the local map representation.

* * * * *